(12) United States Patent
Tobin et al.

(10) Patent No.: US 11,548,246 B2
(45) Date of Patent: Jan. 10, 2023

(54) APPARATUS FOR MANUFACTURING COMPOSITE AIRFOILS

(71) Applicant: General Electric Company, Schenectady, NY (US)

(72) Inventors: James Robert Tobin, Simpsonville, SC (US); Stephen Bertram Johnson, New Castle, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/347,714

(22) Filed: Jun. 15, 2021

(65) Prior Publication Data
US 2021/0331432 A1    Oct. 28, 2021

Related U.S. Application Data

(63) Continuation of application No. 15/819,042, filed on Nov. 21, 2017, now Pat. No. 11,040,503.

(51) Int. Cl.
*B29C 70/54* (2006.01)
*B29C 33/34* (2006.01)
(Continued)

(52) U.S. Cl.
CPC .............. *B29C 70/54* (2013.01); *B29C 33/34* (2013.01); *B29C 69/001* (2013.01); *B29C 70/38* (2013.01);
(Continued)

(58) Field of Classification Search
CPC ....... B29C 70/54; B29C 69/001; B29C 70/38; B29C 70/382; B29C 70/386; B29C 33/34; B29C 64/209
See application file for complete search history.

(56) References Cited

U.S. PATENT DOCUMENTS

RE19,412 E    1/1935  Zaparka
2,450,440 A   10/1948 Mills
(Continued)

FOREIGN PATENT DOCUMENTS

CN    101906251 A    12/2010
CN    103358564 A    10/2013
(Continued)

OTHER PUBLICATIONS

Office Action Report for Brazil Application No. BR112020009486-2, dated Mar. 8, 2022.
(Continued)

*Primary Examiner* — Joseph S Del Sole
*Assistant Examiner* — Mohamed K Ahmed Ali
(74) *Attorney, Agent, or Firm* — Dority & Manning, P.A.

(57) ABSTRACT

The present disclosure is directed to an apparatus for manufacturing a composite component. The apparatus includes a mold onto which the composite component is formed. The mold is disposed within a grid defined by a first axis and a second axis. The apparatus further includes a first frame assembly disposed above the mold, and a plurality of machine heads coupled to the first frame assembly within the grid in an adjacent arrangement along the first axis. At least one of the mold or the plurality of machine heads is moveable along the first axis, the second axis, or both. At least one of the machine heads of the plurality of machine heads is moveable independently of one another along a third axis.

20 Claims, 25 Drawing Sheets

(51) Int. Cl.
  *B29C 70/38* (2006.01)
  *B29C 64/209* (2017.01)
  *B29C 69/00* (2006.01)
  *B33Y 80/00* (2015.01)
  *B29D 99/00* (2010.01)
  *B29L 31/08* (2006.01)
  *B33Y 30/00* (2015.01)
  *F03D 1/06* (2006.01)

(52) U.S. Cl.
  CPC .......... *B29C 70/382* (2013.01); *B29C 70/386* (2013.01); *B29D 99/0028* (2013.01); *B33Y 80/00* (2014.12); *B29C 64/209* (2017.08); *B29L 2031/085* (2013.01); *B33Y 30/00* (2014.12); *F03D 1/0675* (2013.01); *F05B 2230/30* (2013.01); *F05B 2280/6003* (2013.01)

(56) References Cited

U.S. PATENT DOCUMENTS

| | | |
|---|---|---|
| 2,451,131 A | 10/1948 | Vidal |
| 2,503,450 A | 4/1950 | Nebesar |
| 3,000,446 A | 9/1961 | Warnken |
| 3,093,219 A | 6/1963 | Ramme |
| 3,137,887 A | 6/1964 | Mannino et al. |
| 3,321,019 A | 5/1967 | Dmitroff et al. |
| 3,528,753 A | 9/1970 | Dutton et al. |
| 3,586,460 A | 6/1971 | Toner |
| 3,956,564 A | 5/1976 | Hillig |
| 4,319,872 A | 3/1982 | Lupke |
| 4,329,119 A | 5/1982 | Baskin |
| 4,474,536 A | 10/1984 | Gougeon et al. |
| 4,626,172 A | 12/1986 | Mouille et al. |
| 4,718,844 A | 1/1988 | Dickhut |
| 5,059,109 A | 10/1991 | Dickhut |
| 5,088,665 A | 2/1992 | Vijgen et al. |
| 5,346,367 A | 9/1994 | Doolin et al. |
| 6,264,877 B1 | 7/2001 | Pallu De La Barriere |
| 6,890,152 B1 | 5/2005 | Thisted |
| 7,059,833 B2 | 6/2006 | Stiesdal et al. |
| 7,364,407 B2 | 4/2008 | Grabau |
| 7,458,777 B2 | 12/2008 | Herr |
| 7,637,721 B2 | 12/2009 | Driver et al. |
| 7,976,275 B2 | 7/2011 | Miebach et al. |
| 7,988,421 B2 | 8/2011 | Bakhuis et al. |
| 8,007,624 B2 | 8/2011 | Stiesdal |
| 8,062,728 B2 | 11/2011 | De Beats |
| 8,083,488 B2 | 12/2011 | Fritz |
| 8,092,187 B2 | 1/2012 | Bell |
| 8,162,590 B2 | 4/2012 | Haag |
| 8,273,806 B2 | 9/2012 | Guadagno et al. |
| 8,317,479 B2 | 11/2012 | Vronsky et al. |
| 8,376,450 B1 | 2/2013 | Long et al. |
| 8,540,491 B2 | 9/2013 | Grahn |
| 8,602,761 B2 | 12/2013 | Arrizabalaga |
| 8,657,581 B2 | 2/2014 | Pilpel et al. |
| 8,673,106 B1 | 3/2014 | Jolley et al. |
| 8,678,746 B2 | 3/2014 | Haag |
| 8,708,691 B2 | 4/2014 | Matsen et al. |
| 8,747,098 B1 | 6/2014 | Johnson et al. |
| 8,865,798 B2 | 10/2014 | Merle et al. |
| 8,877,116 B2 | 11/2014 | Grabau |
| 8,932,024 B2 | 1/2015 | Hayashi et al. |
| 8,961,142 B2 | 2/2015 | Wansink |
| 8,992,813 B2 | 3/2015 | Robbins et al. |
| 9,090,027 B2 | 7/2015 | Sutton |
| 9,150,721 B2 | 10/2015 | Bateman et al. |
| 9,377,005 B2 | 6/2016 | Yarbrough et al. |
| 9,434,142 B2 | 9/2016 | Levit |
| 9,458,821 B2 | 10/2016 | Jacobsen et al. |
| 9,512,818 B2 | 12/2016 | Richtman |
| 9,719,489 B2 | 8/2017 | Stewart |
| 10,273,935 B2 | 4/2019 | Albert |
| 10,830,206 B2 | 11/2020 | Tobin et al. |
| 2004/0253114 A1 | 12/2004 | Gunneskov et al. |
| 2007/0065290 A1 | 3/2007 | Herr |
| 2007/0077150 A1 | 4/2007 | Llorente Gonzalez |
| 2007/0107189 A1 | 5/2007 | Prichard |
| 2009/0068017 A1 | 3/2009 | Rudling |
| 2009/0074585 A1 | 3/2009 | Koegler et al. |
| 2009/0140527 A1 | 6/2009 | Pawar |
| 2009/0143207 A1 | 6/2009 | Wampler et al. |
| 2009/0148300 A1 | 6/2009 | Driver et al. |
| 2009/0155084 A1 | 6/2009 | Livingston et al. |
| 2009/0301648 A1 | 12/2009 | Hogg et al. |
| 2010/0047070 A1 | 2/2010 | Slot |
| 2010/0121475 A1 | 5/2010 | Lyons |
| 2010/0135806 A1 | 6/2010 | Benito |
| 2010/0135815 A1 | 6/2010 | Bagepalli |
| 2010/0140849 A1 | 6/2010 | Comb et al. |
| 2010/0296940 A1 | 11/2010 | Zuteck |
| 2010/0296941 A1 | 11/2010 | Zuteck |
| 2011/0018282 A1 | 1/2011 | Hayashi et al. |
| 2011/0076149 A1 | 3/2011 | Santiago et al. |
| 2011/0097211 A1 | 4/2011 | Rudling |
| 2011/0097326 A1 | 4/2011 | Luehrsen |
| 2011/0100540 A1 | 5/2011 | Matthew |
| 2011/0103965 A1 | 5/2011 | Matthew |
| 2011/0135467 A1 | 6/2011 | Saddoughi et al. |
| 2011/0142635 A1 | 6/2011 | Frizt |
| 2011/0142667 A1 | 6/2011 | Miebach et al. |
| 2011/0142668 A1 | 6/2011 | Rao |
| 2011/0142670 A1 | 6/2011 | Pilpel |
| 2011/0176928 A1 | 7/2011 | Jensen |
| 2011/0200444 A1 | 8/2011 | Garcia |
| 2011/0223028 A1 | 9/2011 | Stege et al. |
| 2011/0243736 A1 | 10/2011 | Bell |
| 2011/0243750 A1 | 10/2011 | Gruhn |
| 2011/0266721 A1 | 11/2011 | Song et al. |
| 2011/0268558 A1 | 11/2011 | Driver |
| 2011/0286853 A1 | 11/2011 | Kristensen |
| 2012/0009069 A1 | 1/2012 | Grove-Nielsen |
| 2012/0027590 A1 | 2/2012 | Bonnet |
| 2012/0027610 A1 | 2/2012 | Yarbrough |
| 2012/0027612 A1 | 2/2012 | Yarbrough |
| 2012/0027613 A1 | 2/2012 | Yarbrough |
| 2012/0121430 A1 | 5/2012 | Olsen et al. |
| 2012/0128810 A1 | 5/2012 | Arriola Arrizabalaga et al. |
| 2012/0134848 A1 | 5/2012 | Ramirez Jimenez et al. |
| 2012/0138218 A1 | 6/2012 | Dean et al. |
| 2012/0183408 A1 | 7/2012 | Noerlem |
| 2012/0186730 A1 | 7/2012 | Shindo |
| 2012/0263913 A1 | 10/2012 | Karem |
| 2013/0108455 A1 | 5/2013 | Quiring et al. |
| 2013/0118683 A1 | 5/2013 | Nelson et al. |
| 2013/0164133 A1 | 6/2013 | Grove-Nielsen |
| 2013/0186558 A1 | 7/2013 | Comb |
| 2013/0241117 A1 | 9/2013 | Lind |
| 2014/0072715 A1 | 3/2014 | Jones et al. |
| 2014/0178204 A1 | 6/2014 | Livingston et al. |
| 2014/0186175 A1 | 7/2014 | Baehmann et al. |
| 2014/0205454 A1 | 7/2014 | Giovannetti et al. |
| 2014/0295187 A1 | 10/2014 | Jacobsen |
| 2014/0322023 A1 | 10/2014 | Tapia |
| 2014/0328692 A1 | 11/2014 | Riddell et al. |
| 2014/0334930 A1 | 11/2014 | Rob |
| 2015/0079217 A1 | 3/2015 | Oudsen |
| 2015/0224759 A1 | 8/2015 | Boon |
| 2015/0247487 A1 | 9/2015 | Oerlemans et al. |
| 2015/0308404 A1 | 10/2015 | Dahl |
| 2015/0316028 A1 | 11/2015 | Breckenfeld |
| 2015/0322920 A1 | 11/2015 | Jones |
| 2016/0023433 A1 | 1/2016 | Langone |
| 2016/0052173 A1 | 2/2016 | Hunter |
| 2016/0067920 A1 | 3/2016 | Fontaine |
| 2016/0107397 A1 | 4/2016 | Schibsbye |
| 2016/0146019 A1 | 5/2016 | Pizano et al. |
| 2016/0168997 A1 | 6/2016 | Garm |
| 2016/0263844 A1 | 9/2016 | Smith |
| 2016/0297146 A1 | 10/2016 | Wu |
| 2016/0319801 A1 | 11/2016 | Smith |
| 2016/0327019 A1 | 11/2016 | Tobin et al. |
| 2016/0327020 A1 | 11/2016 | Tobin et al. |

(56) References Cited

U.S. PATENT DOCUMENTS

| | | |
|---|---|---|
| 2016/0327021 A1 | 11/2016 | Tobin et al. |
| 2016/0354984 A1 | 12/2016 | Hedges |
| 2016/0377050 A1 | 12/2016 | Caruso et al. |
| 2016/0377051 A1 | 12/2016 | Caruso et al. |
| 2016/0377052 A1 | 12/2016 | Caruso et al. |
| 2017/0015066 A1 | 1/2017 | Herrmann |
| 2017/0021575 A1 | 1/2017 | Hansen et al. |
| 2017/0022821 A1 | 1/2017 | Ferber |
| 2017/0030330 A1 | 2/2017 | Caruso |
| 2017/0050372 A1 | 2/2017 | Nielsen et al. |
| 2017/0051718 A1 | 2/2017 | Klitgaard |
| 2017/0057158 A1 | 3/2017 | Caruso et al. |
| 2017/0058862 A1 | 3/2017 | Caruso et al. |
| 2017/0058865 A1 | 3/2017 | Caruso et al. |
| 2017/0058866 A1 | 3/2017 | Caruso |
| 2017/0074236 A1 | 3/2017 | Hynum et al. |
| 2017/0074237 A1 | 3/2017 | Caruso et al. |
| 2017/0074238 A1 | 3/2017 | Tobin et al. |
| 2017/0074240 A1 | 3/2017 | Caruso et al. |
| 2017/0082087 A1 | 3/2017 | Yarbrough |
| 2017/0082088 A1 | 3/2017 | Yarbrough et al. |
| 2017/0100902 A1 | 4/2017 | Asmatulu et al. |
| 2017/0113265 A1 | 4/2017 | Slavens et al. |
| 2017/0122287 A1 | 5/2017 | Dobbe et al. |
| 2017/0145990 A1 | 5/2017 | Drack et al. |
| 2017/0175534 A1 | 6/2017 | Ferber |
| 2017/0204833 A1 | 7/2017 | Albert et al. |
| 2017/0225362 A1 | 8/2017 | Anthony et al. |
| 2017/0252966 A1 | 9/2017 | Susnjara |
| 2017/0306766 A1 | 10/2017 | Munzer |
| 2018/0135602 A1 | 5/2018 | Tobin et al. |
| 2018/0156190 A1 | 6/2018 | Johnson |
| 2018/0216601 A1 | 8/2018 | Yarbrough |
| 2018/0223794 A1 | 8/2018 | Tobin et al. |
| 2018/0229452 A1 | 8/2018 | Ogale |
| 2018/0264749 A1 | 9/2018 | Albert |
| 2018/0283349 A1 | 10/2018 | Wardropper |
| 2018/0311927 A1 | 11/2018 | Tyan |
| 2019/0001589 A1 | 1/2019 | Salimi |
| 2019/0032491 A1 | 1/2019 | Nissen et al. |
| 2019/0084239 A1 | 3/2019 | Carlson et al. |
| 2019/0153994 A1 | 5/2019 | Tobin |
| 2019/0178227 A1 | 6/2019 | Hawkins |
| 2019/0195191 A1 | 6/2019 | Girolamo |
| 2019/0291861 A1 | 9/2019 | McIntyre et al. |
| 2019/0293049 A1 | 9/2019 | Roberts |

FOREIGN PATENT DOCUMENTS

| | | |
|---|---|---|
| CN | 204488065 U | 7/2015 |
| CN | 104955278 A | 9/2015 |
| CN | 107187020 A | 9/2018 |
| EP | 0435446 A2 | 7/1991 |
| EP | 2204577 A2 | 7/2010 |
| EP | 2653717 A1 | 10/2013 |
| EP | 3037655 A1 | 6/2016 |
| EP | 138697 A1 | 8/2017 |
| ES | 2371893 | 11/2012 |
| JP | H07102609 B2 | 11/1995 |
| JP | 2000/317972 A | 11/2000 |
| JP | 2007/009926 A | 1/2007 |
| JP | 2007/092716 A | 4/2007 |
| JP | 2012/158151 A | 8/2012 |
| JP | 2016/032929 A | 3/2016 |
| KR | 101520898 B1 | 5/2015 |
| WO | WO2006/039953 | 4/2006 |
| WO | WO2010/025830 A2 | 3/2010 |
| WO | WO2011/088835 A2 | 7/2011 |
| WO | WO2011/098785 A2 | 8/2011 |
| WO | WO2012/076168 A2 | 6/2012 |
| WO | WO2013/023745 A1 | 2/2013 |
| WO | WO2013/178624 A2 | 12/2013 |
| WO | WO 2014/094903 A1 | 6/2014 |
| WO | WO2015/015202 A1 | 2/2015 |
| WO | WO 2017/084823 A1 | 5/2017 |
| WO | WO2017/092766 A1 | 6/2017 |

OTHER PUBLICATIONS

European Search Report for EP Application No. 18881970.0, dated Jul. 15, 2021.

CGTech VERICUT, Automated Fibre Placement—wind blade: VERICUT Composite CNC simulation, Sep. 16, 2015, YouTube, 3 Pages. Retrieved from the Internet on Sep. 28, 2019, URL: https://youtu.be/xFNtTE82DiU.

Matt et al., Development of Novel Self-Healing Polymer Composites for Use in Wind Turbine Blades, The American Society of Mechanical Engineers, Journal of Energy Resources Technology, vol. 137, Issue 5, Sep. 1, 2015. (Abstract Only) http://energyresources.asmedigitalcollection.asme.org/article.aspx?articleid=2174064.

Patlolla, New progress in self-healing technology of composite wind turbine blades, Department of Mechanical Engineering, Wichita State University, Feb. 16, 2012, 1 Page. https://soar.wichita.edu/handle/10057/5493 (Abstract Only).

Perivaswamy et al., Novel Characterization Method for Fibrous Materials Using Non-Contact Acoustics: Material Properties Revealed by Ultrasonic Perturbations, Elsevier, Ultrasonics 56, Sep. 16, 2014, pp. 261-369.

Teuwen et al., Vacuum Infused Thermoplastic Composites for Wind Turbine Blades, 2008 Wind Turbine Blade Workshop—Sandia National Laboratories, Jun. 3, 2008, 22 pages.

Zhai et al., Additive Manufacturing: Making Imagination the Major Limitation, Journal of Metals, vol. 66, No. 5, Springer, NY, Mar. 11, 2014, pp. 808-816.

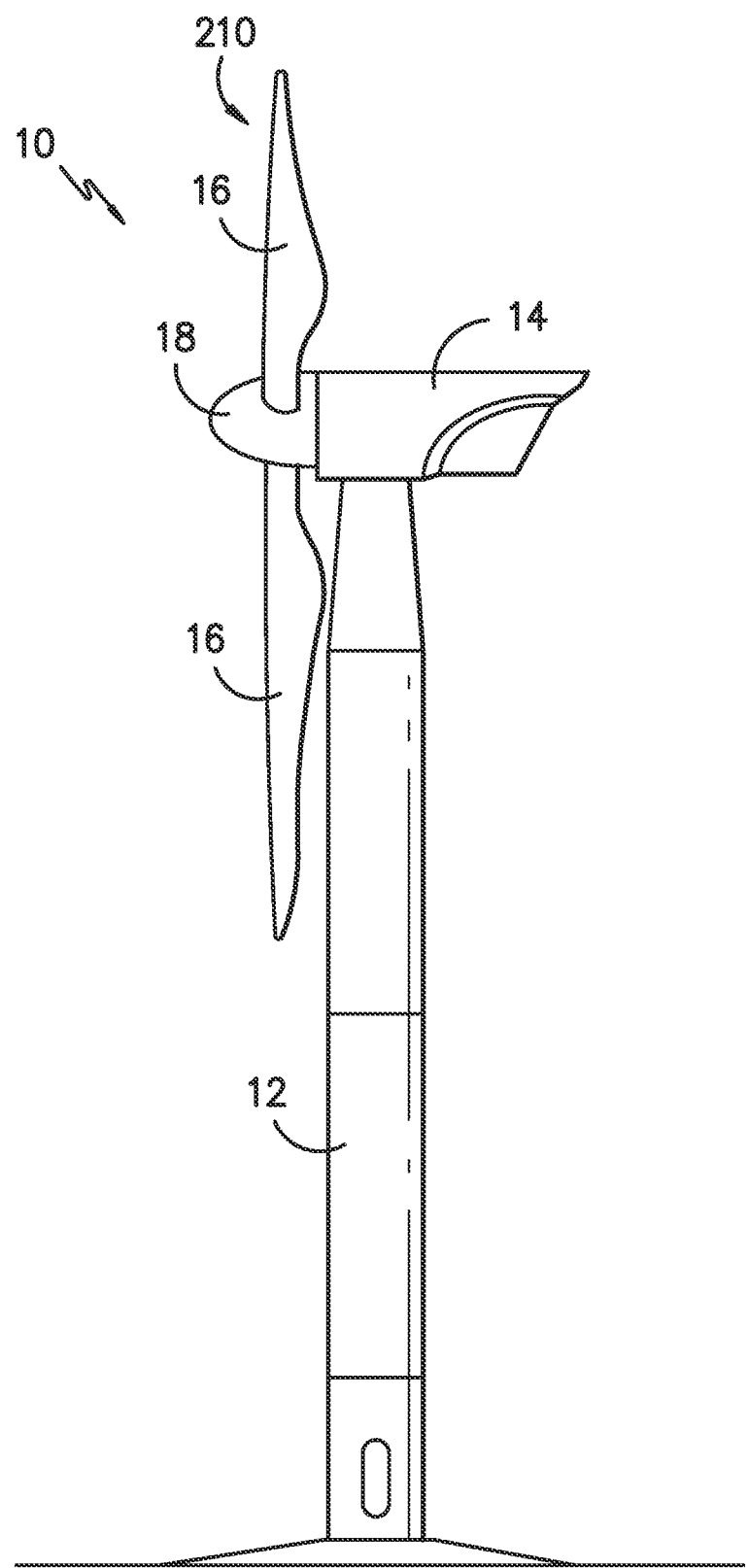
FIG. -1-

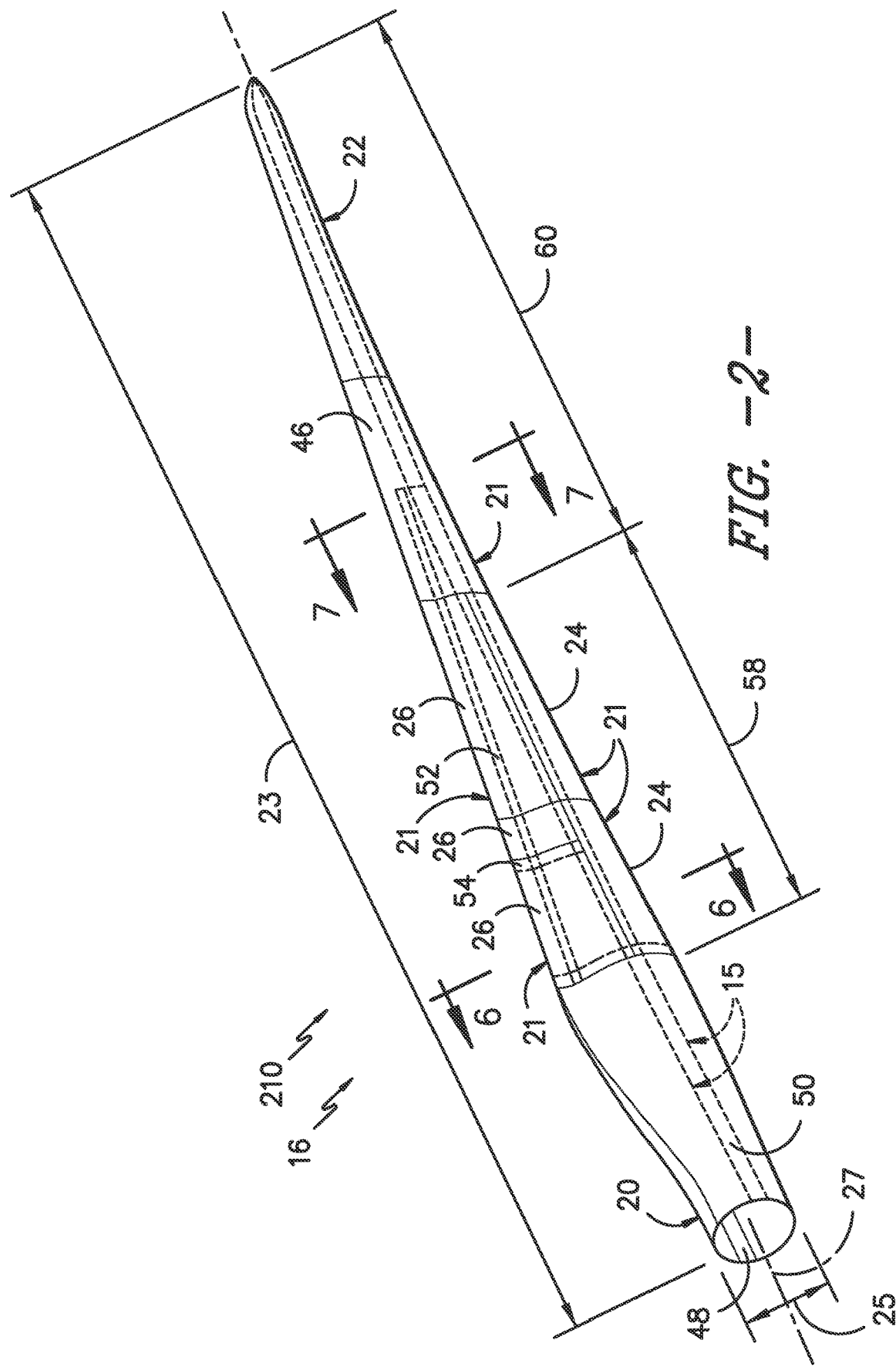

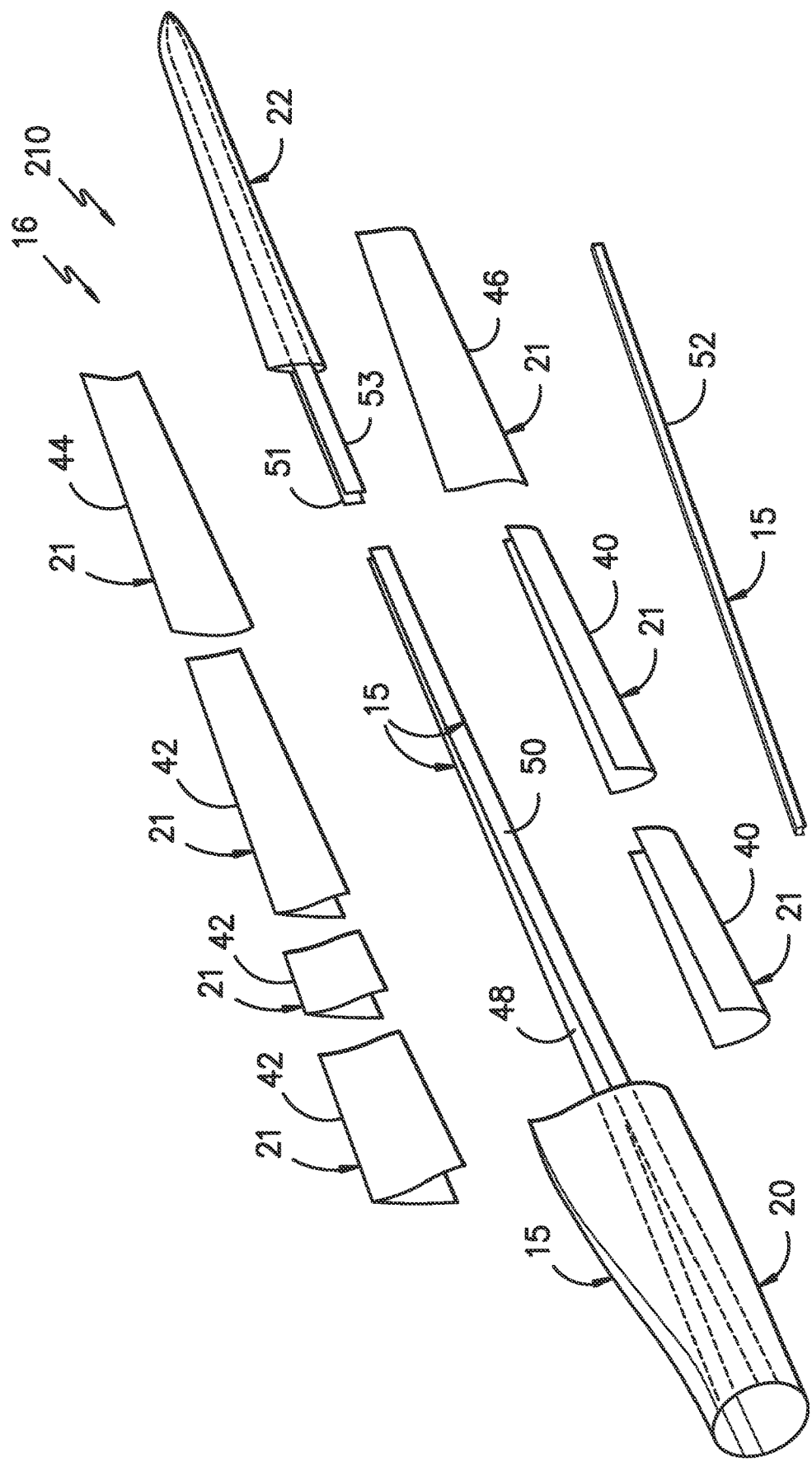
FIG. -3-

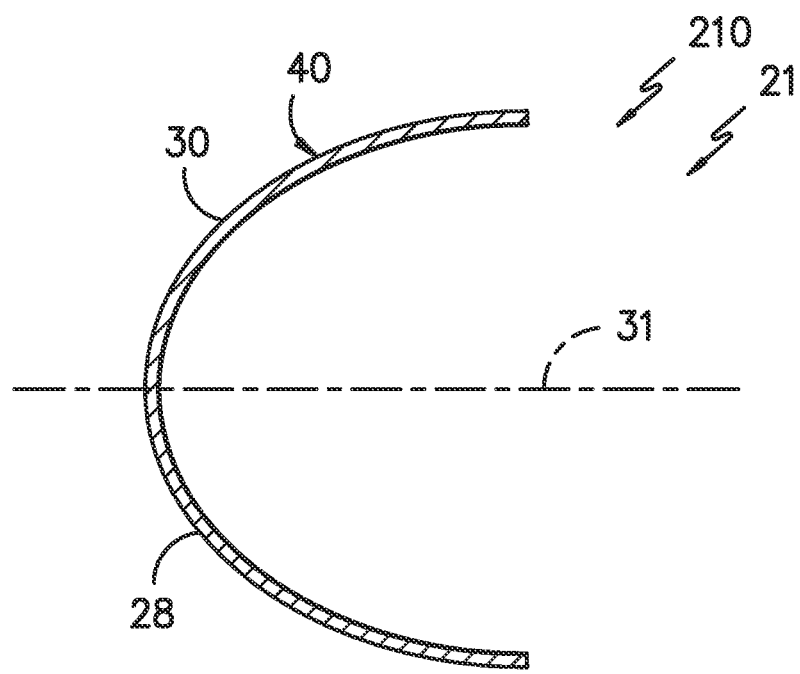
FIG. -4-
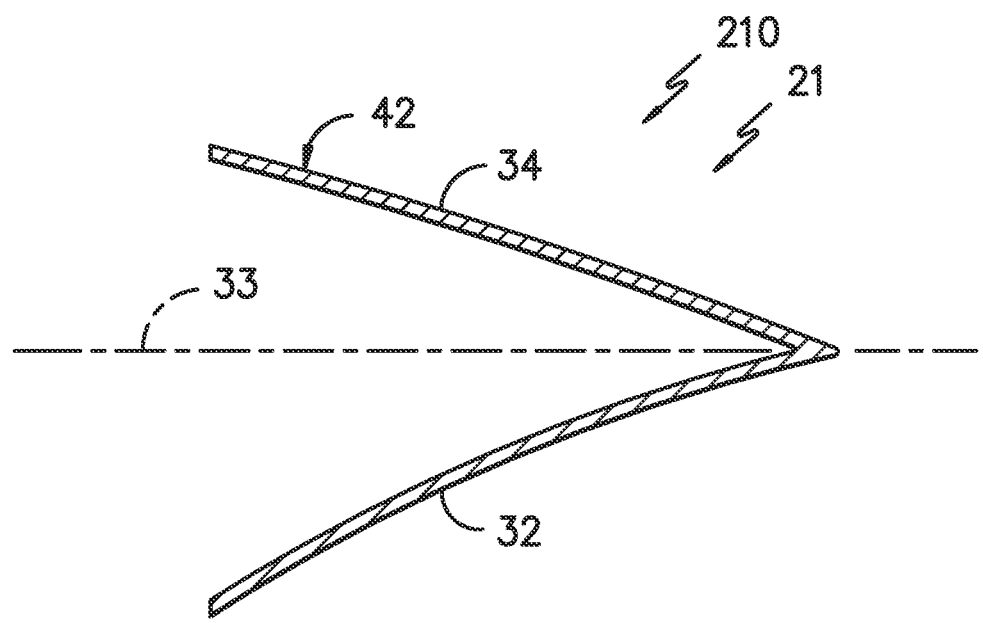
FIG. -5-

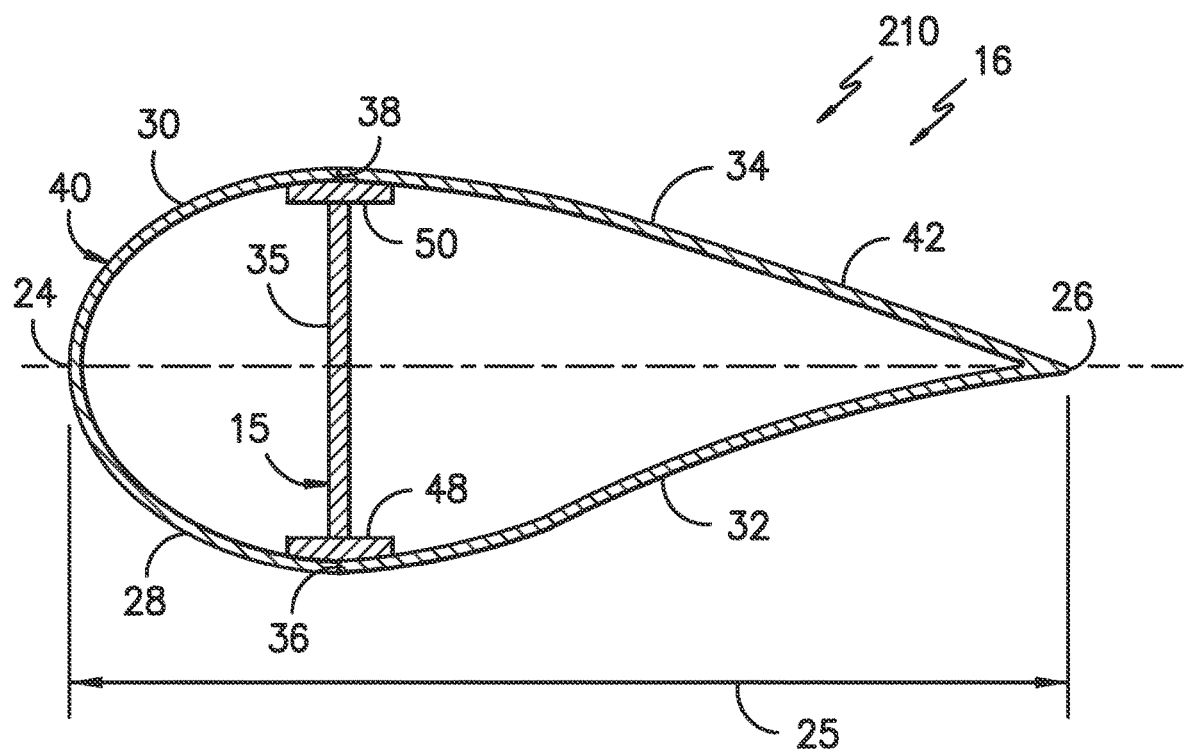
FIG. -6-
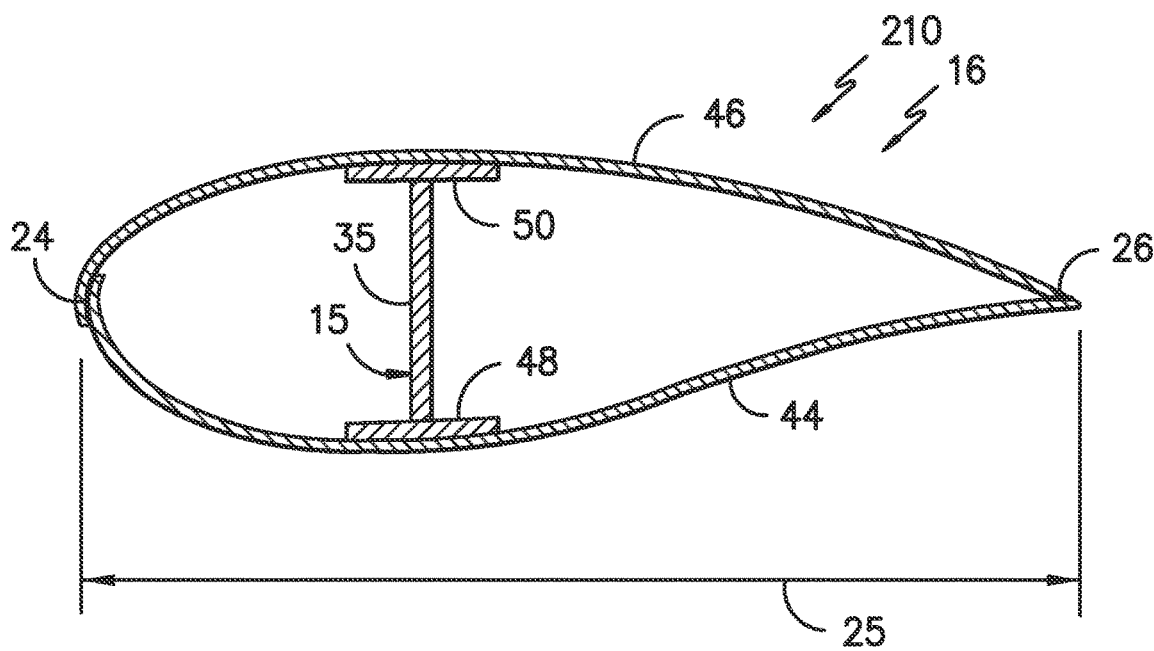
FIG. -7-

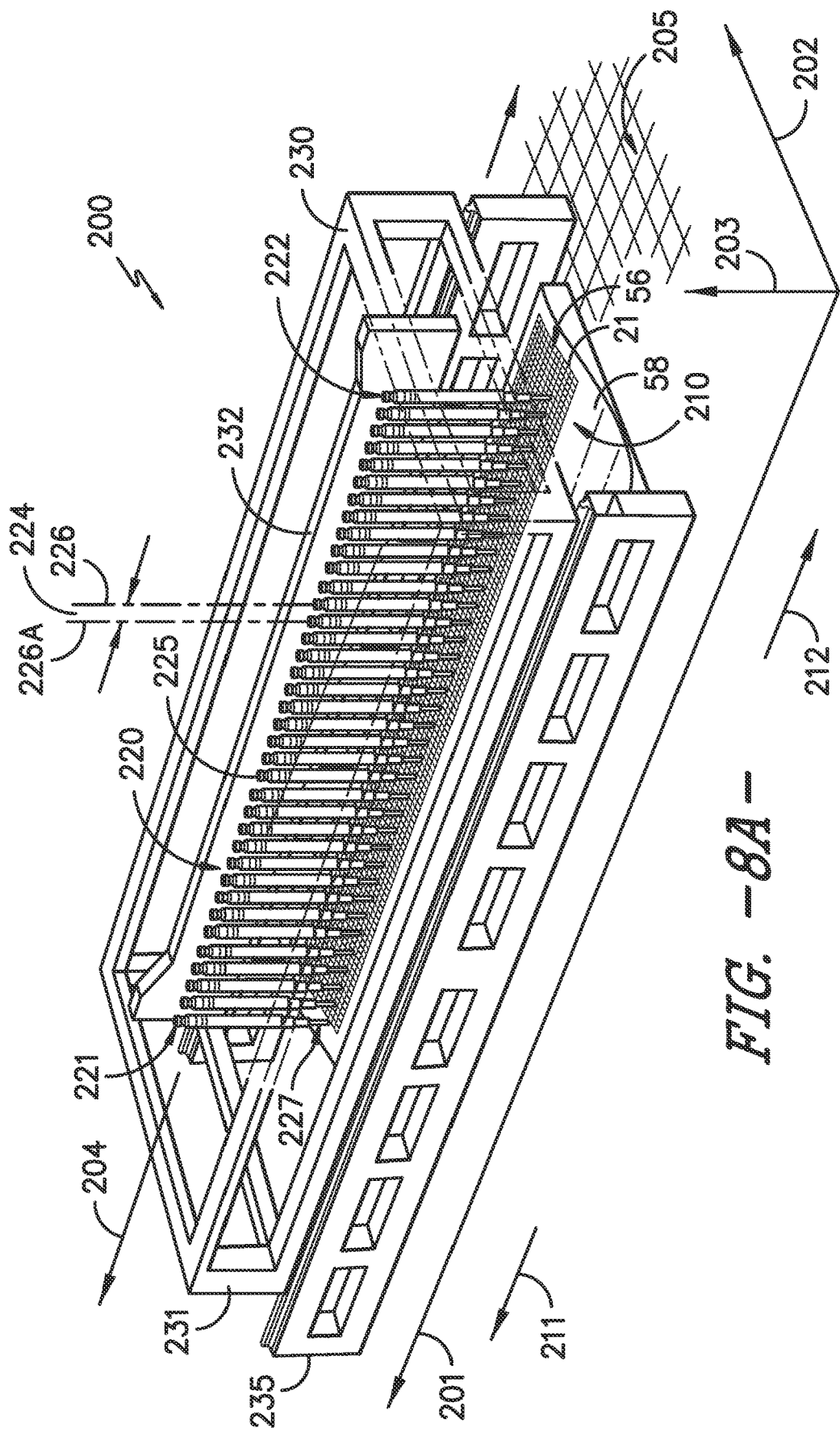
FIG. -8A-

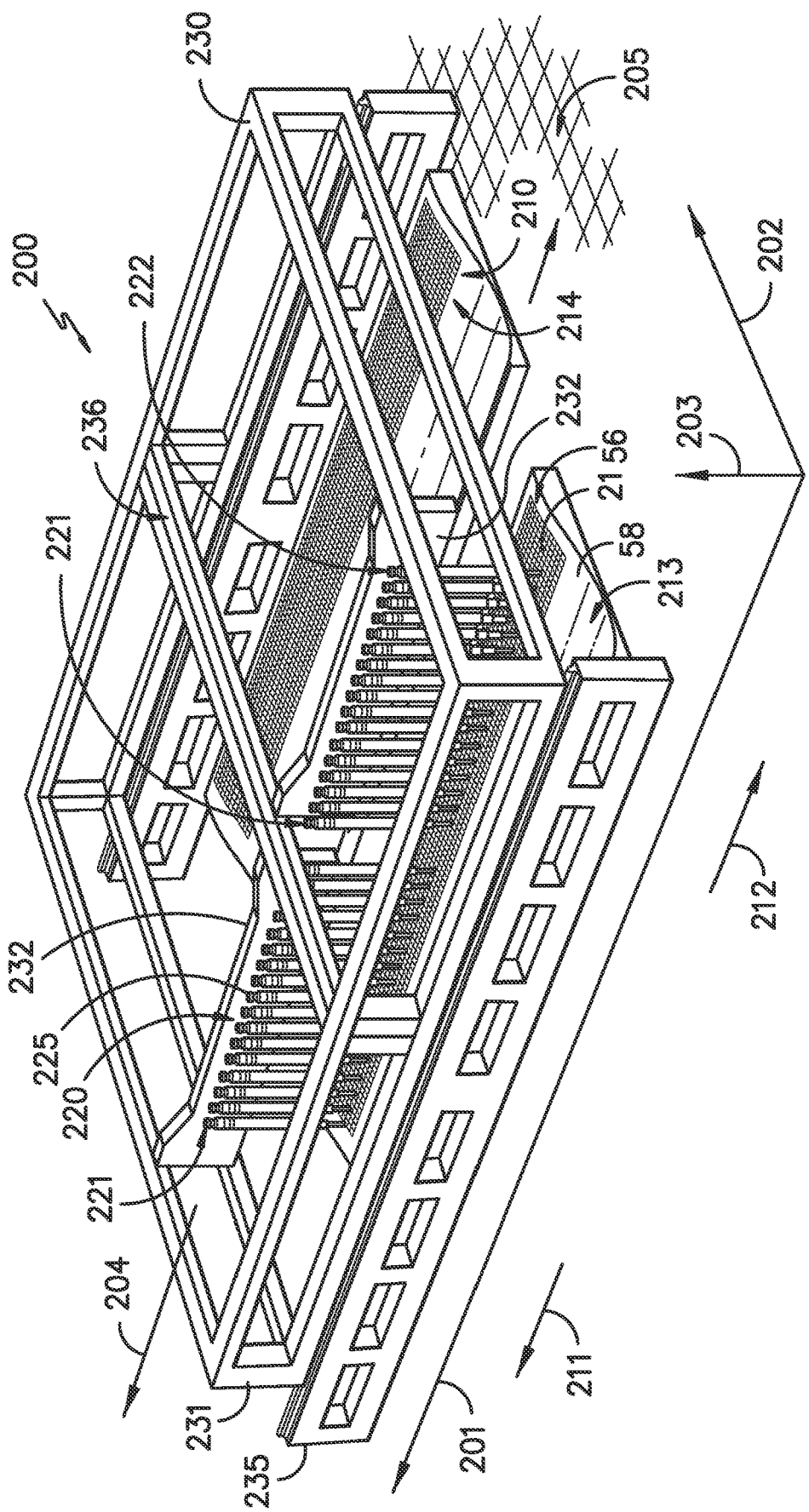
FIG. -8B-

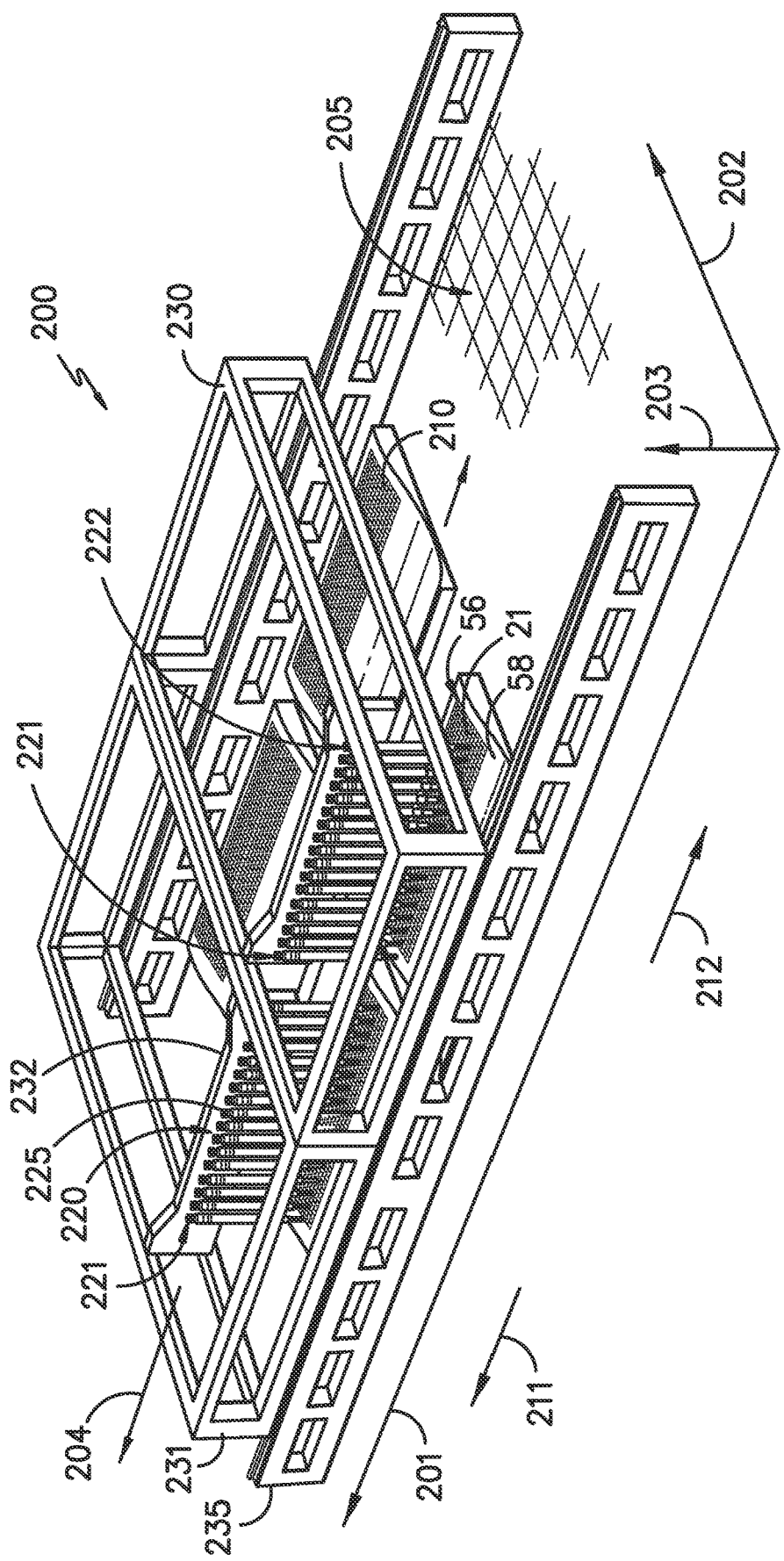
FIG. -8C-

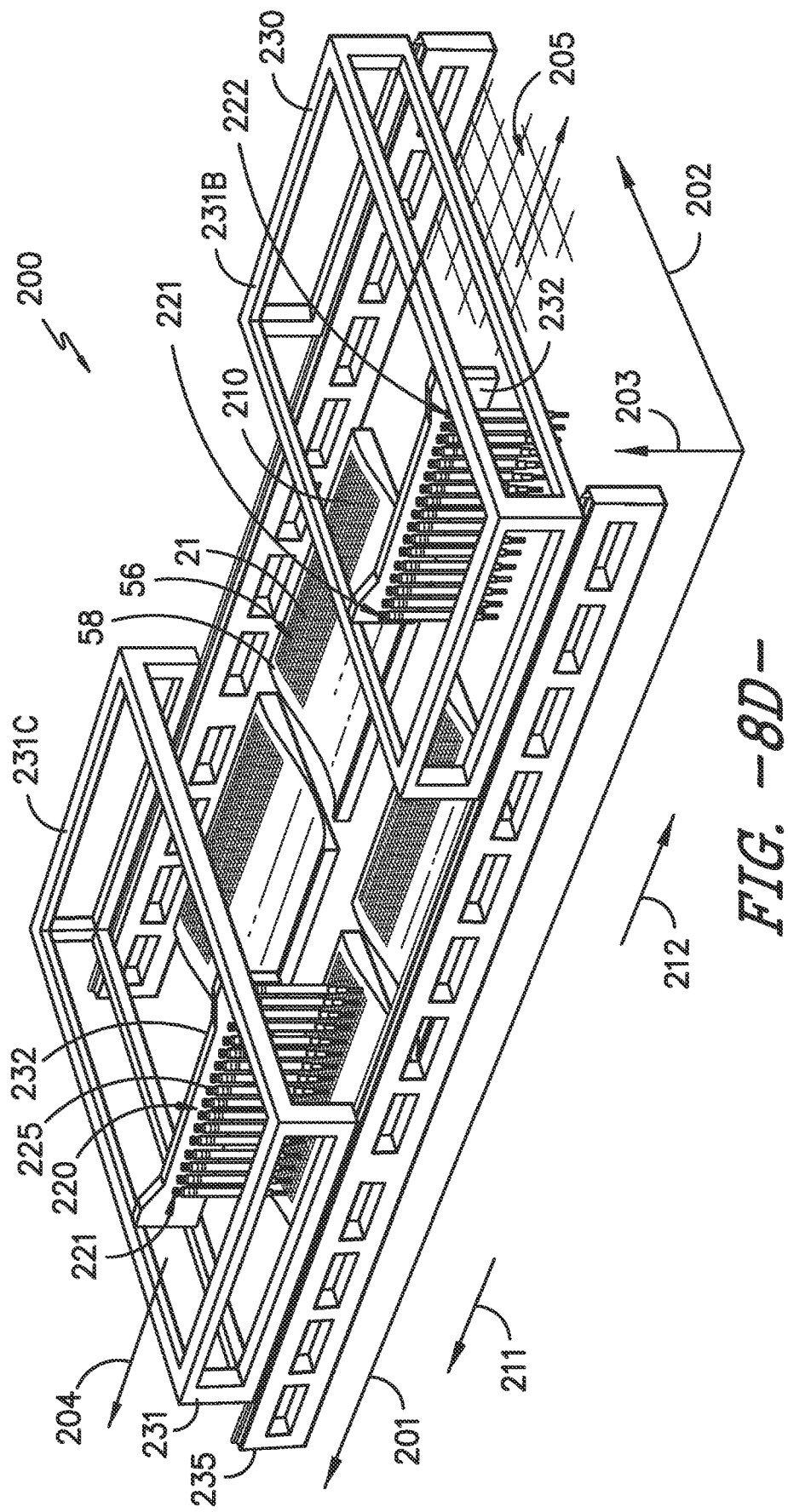
FIG. -8D-

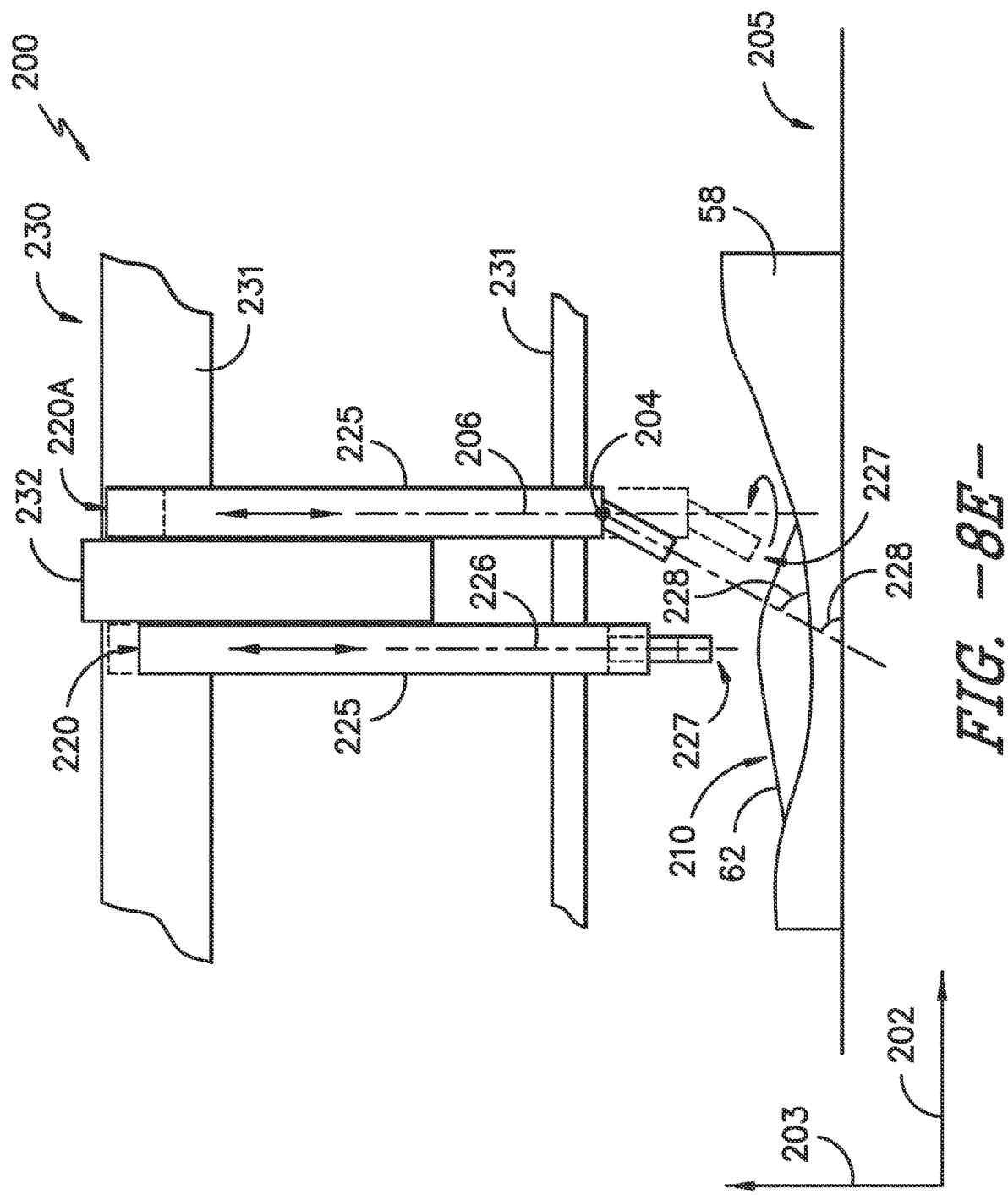

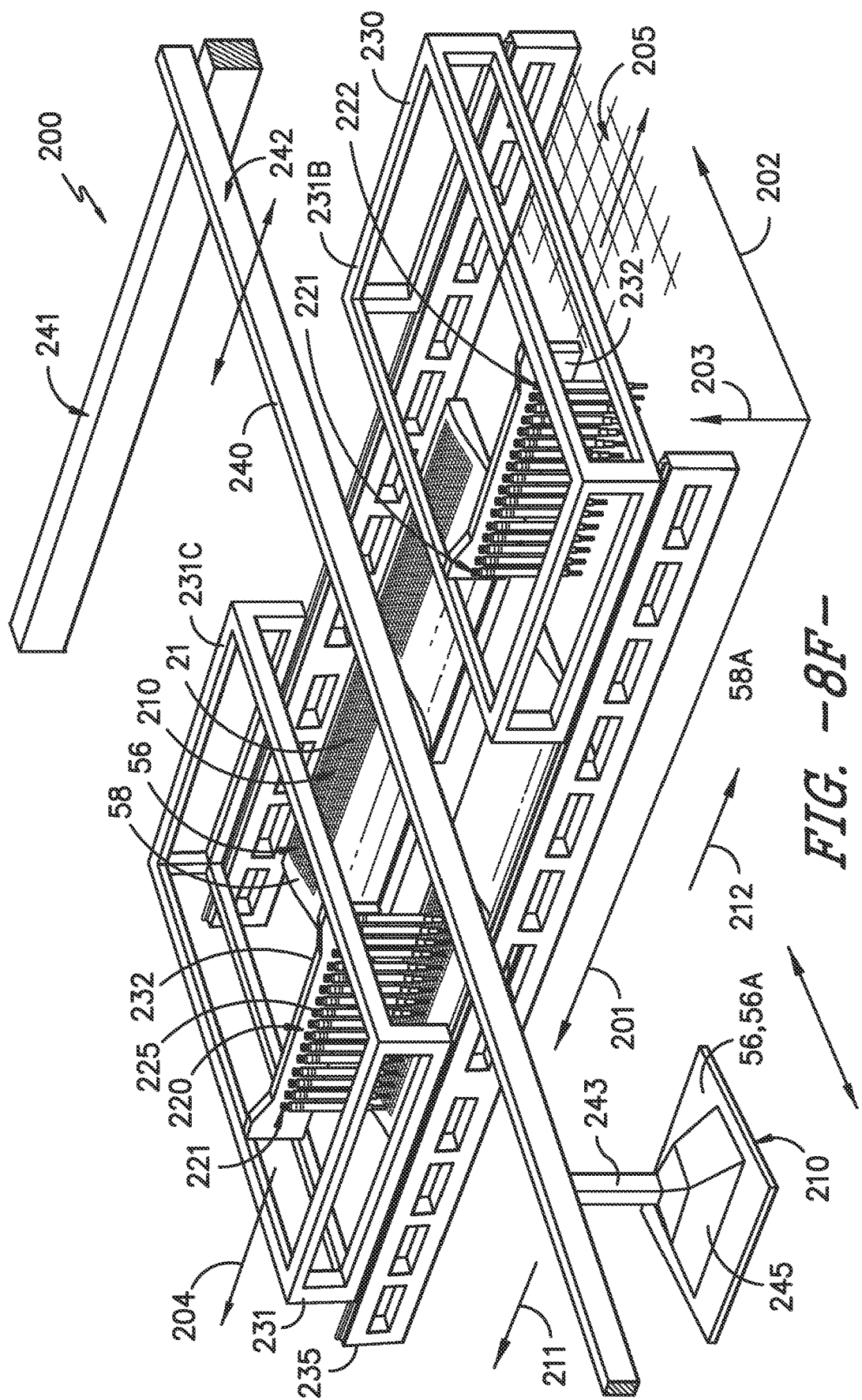
FIG. -8F-

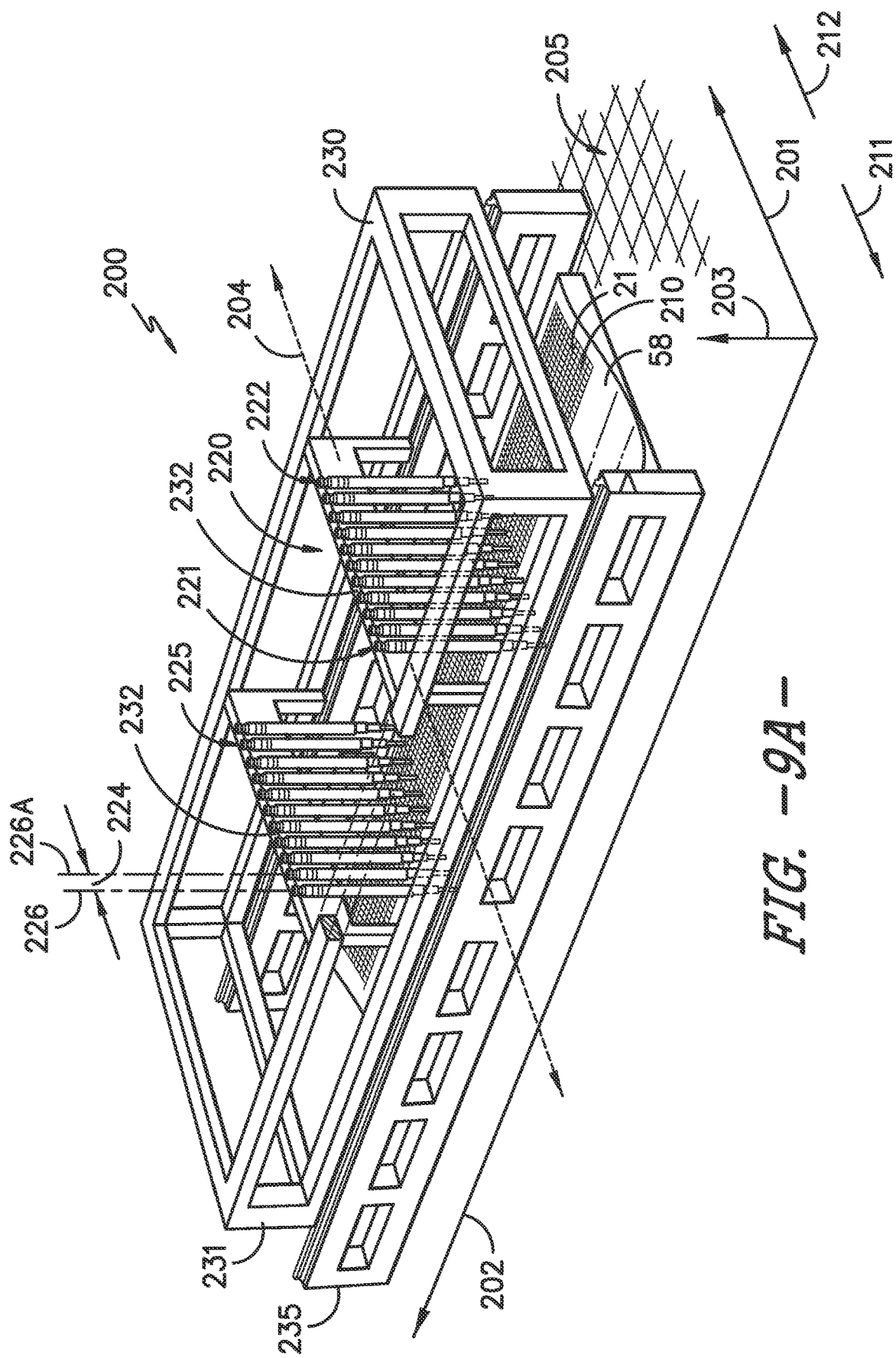
FIG. -9A-

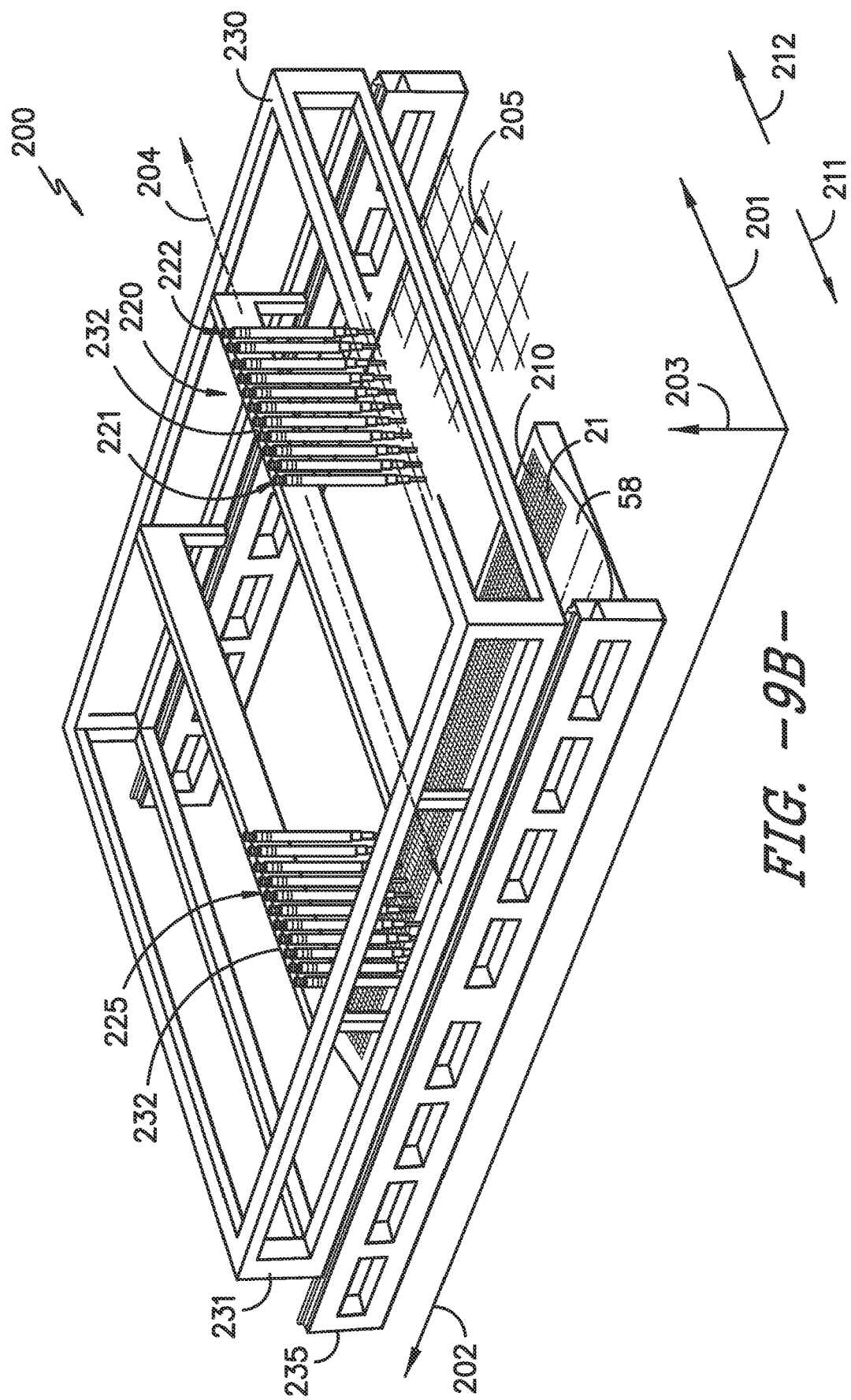
FIG. -9B-

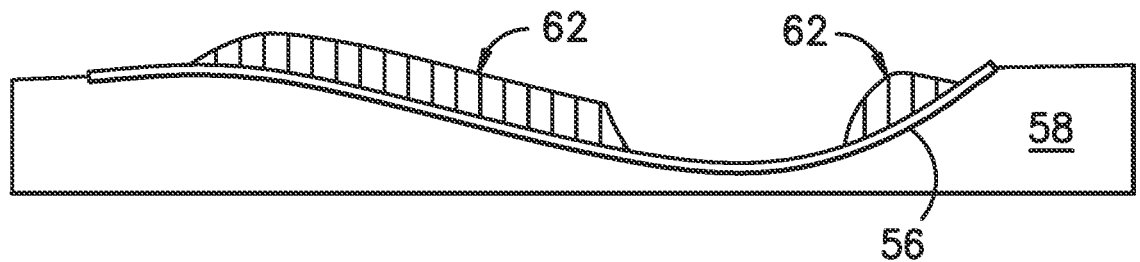
FIG. -10-
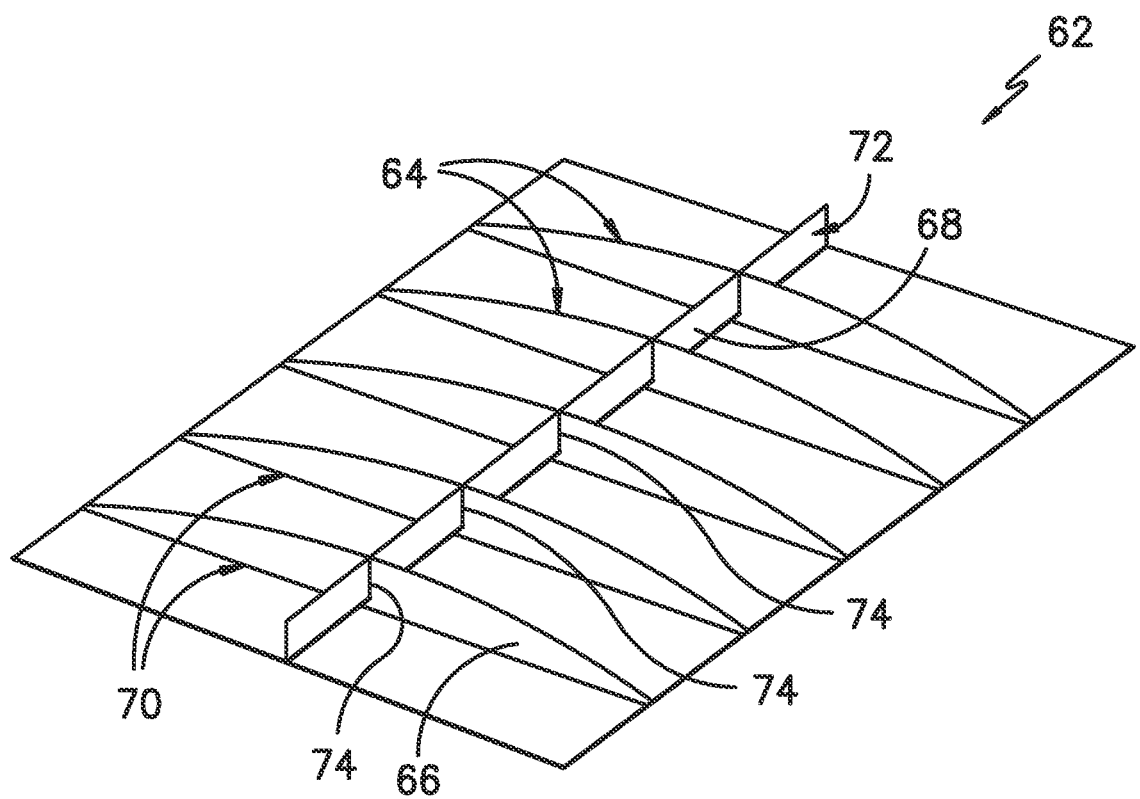
FIG. -11-

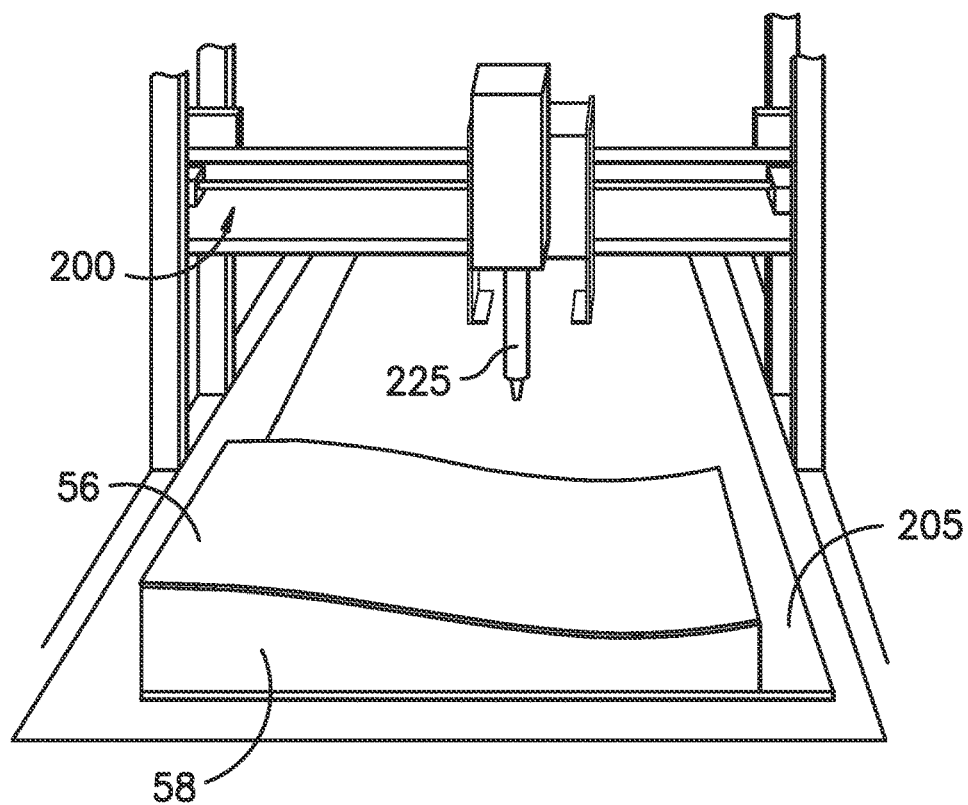
FIG. -12-
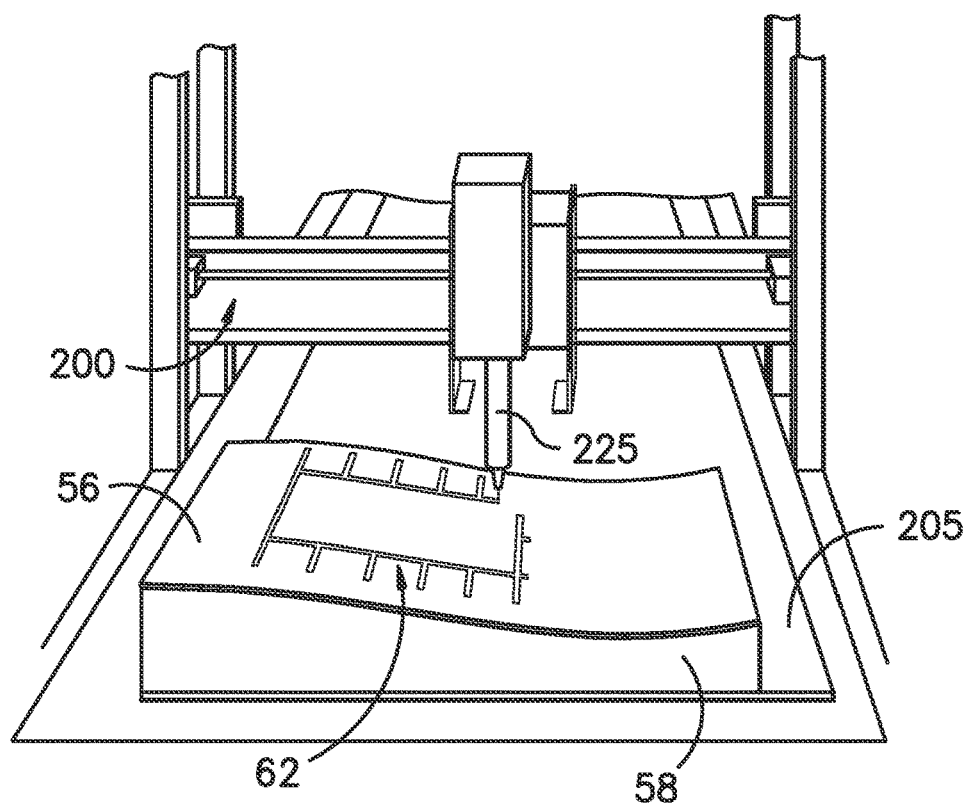
FIG. -13-

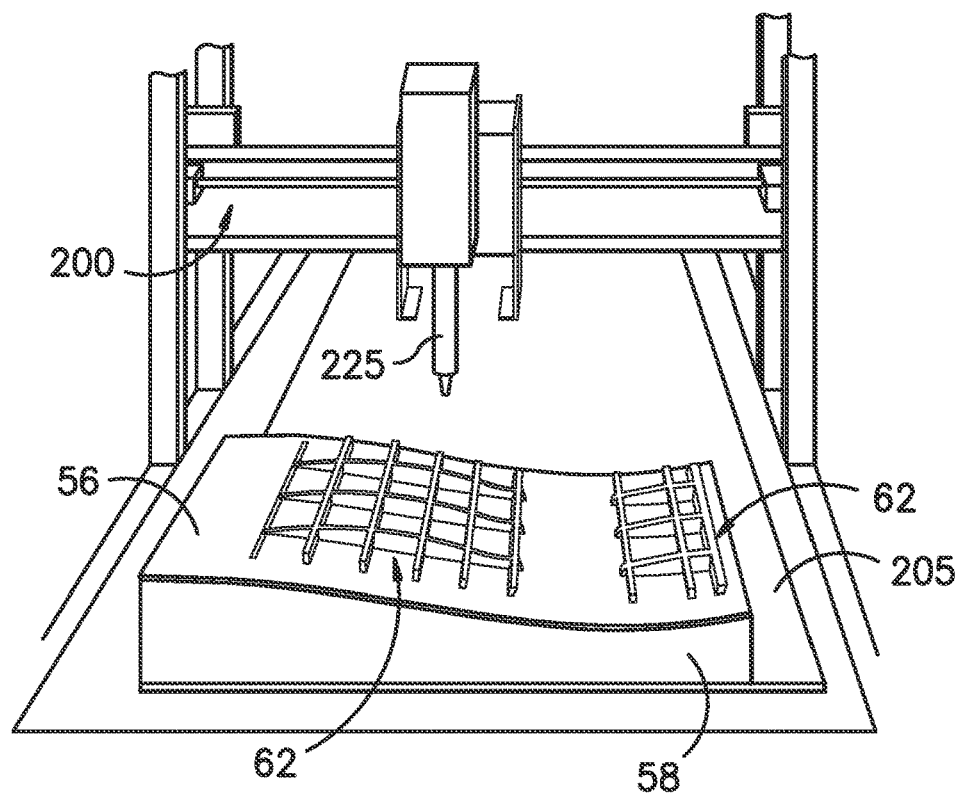
FIG. -14-
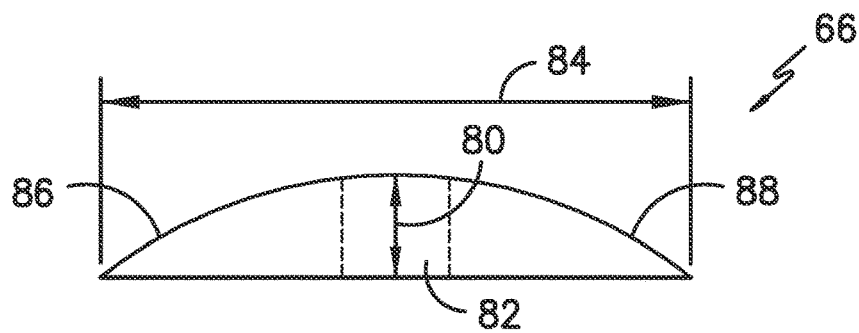
FIG. -15-
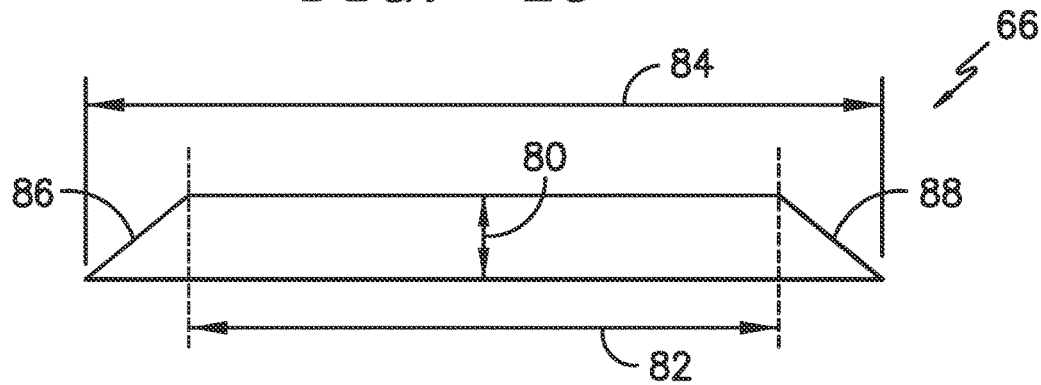
FIG. -16-

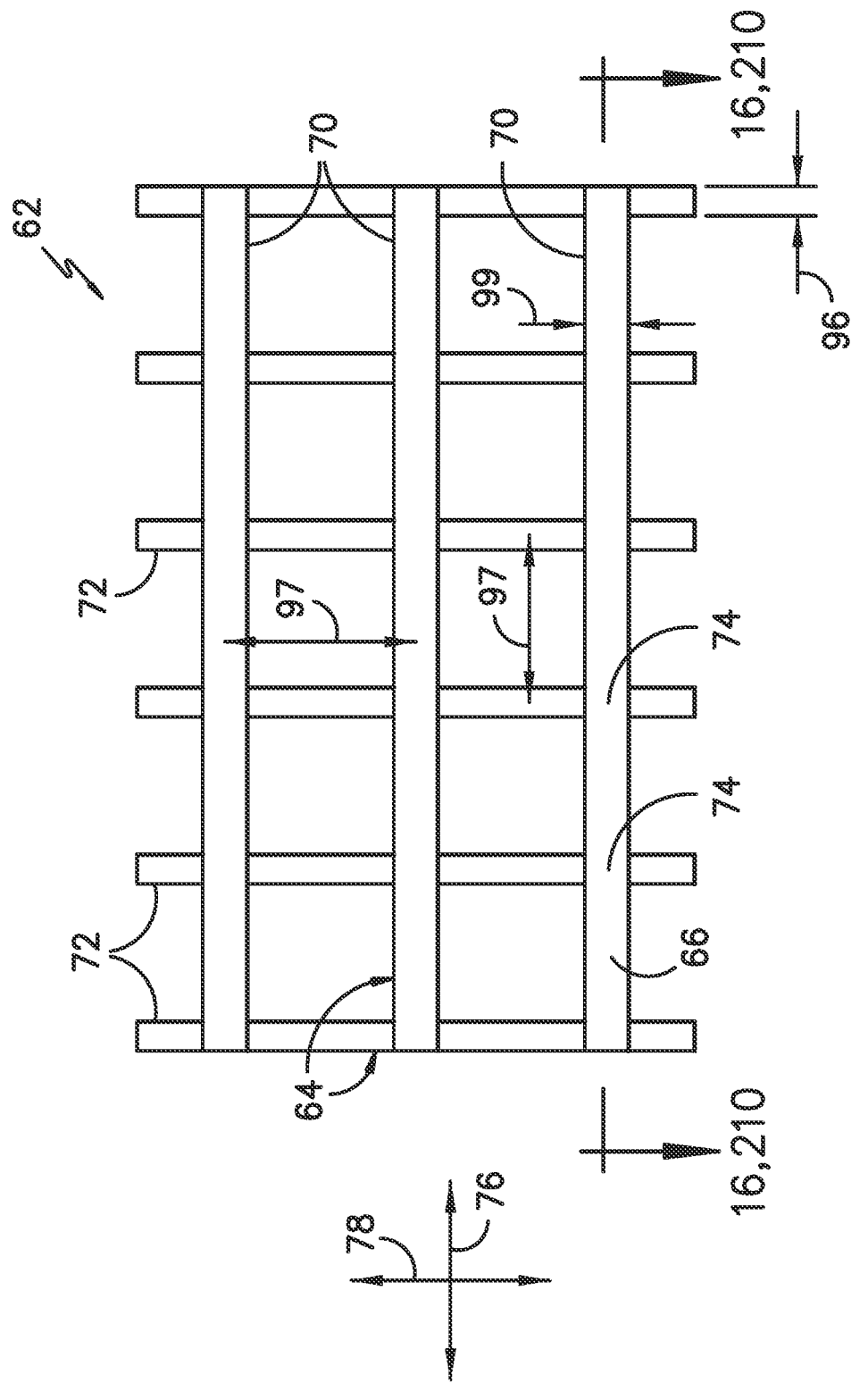
FIG. -17-

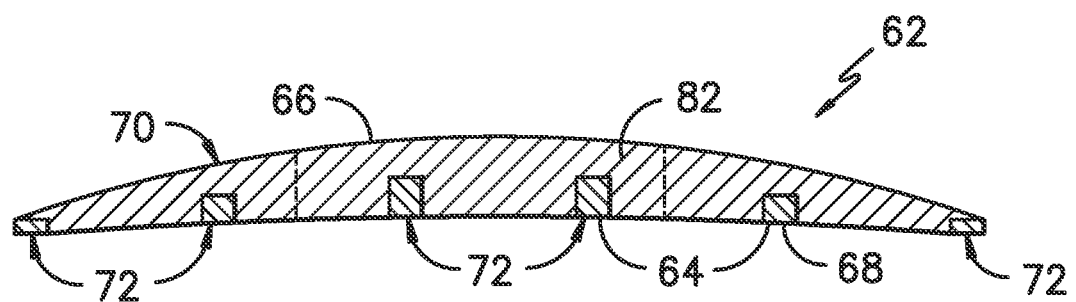
FIG. -18-
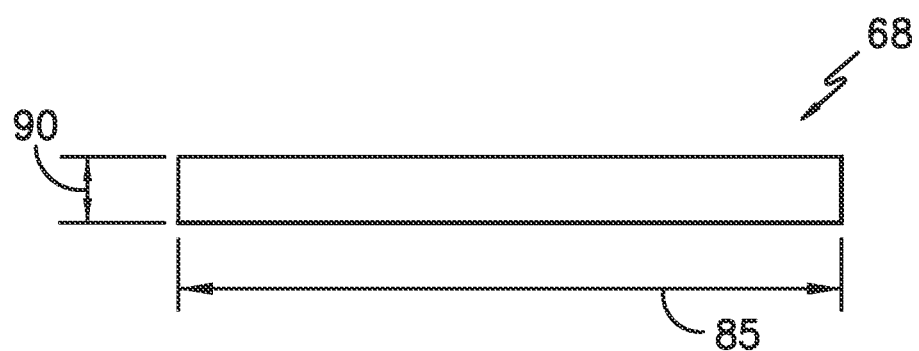
FIG. -19-

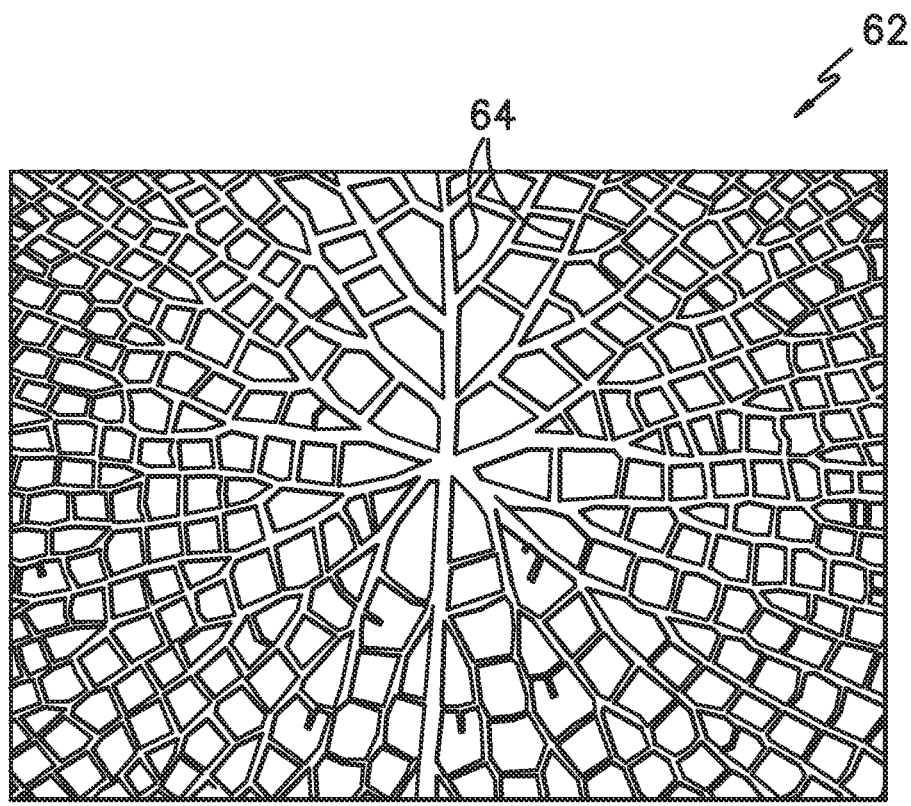
FIG. -20-
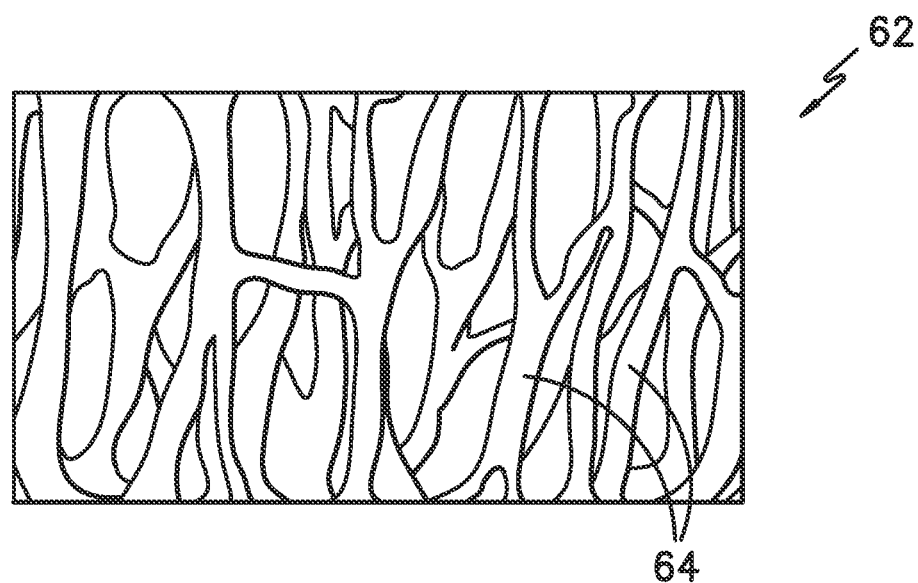
FIG. -21-

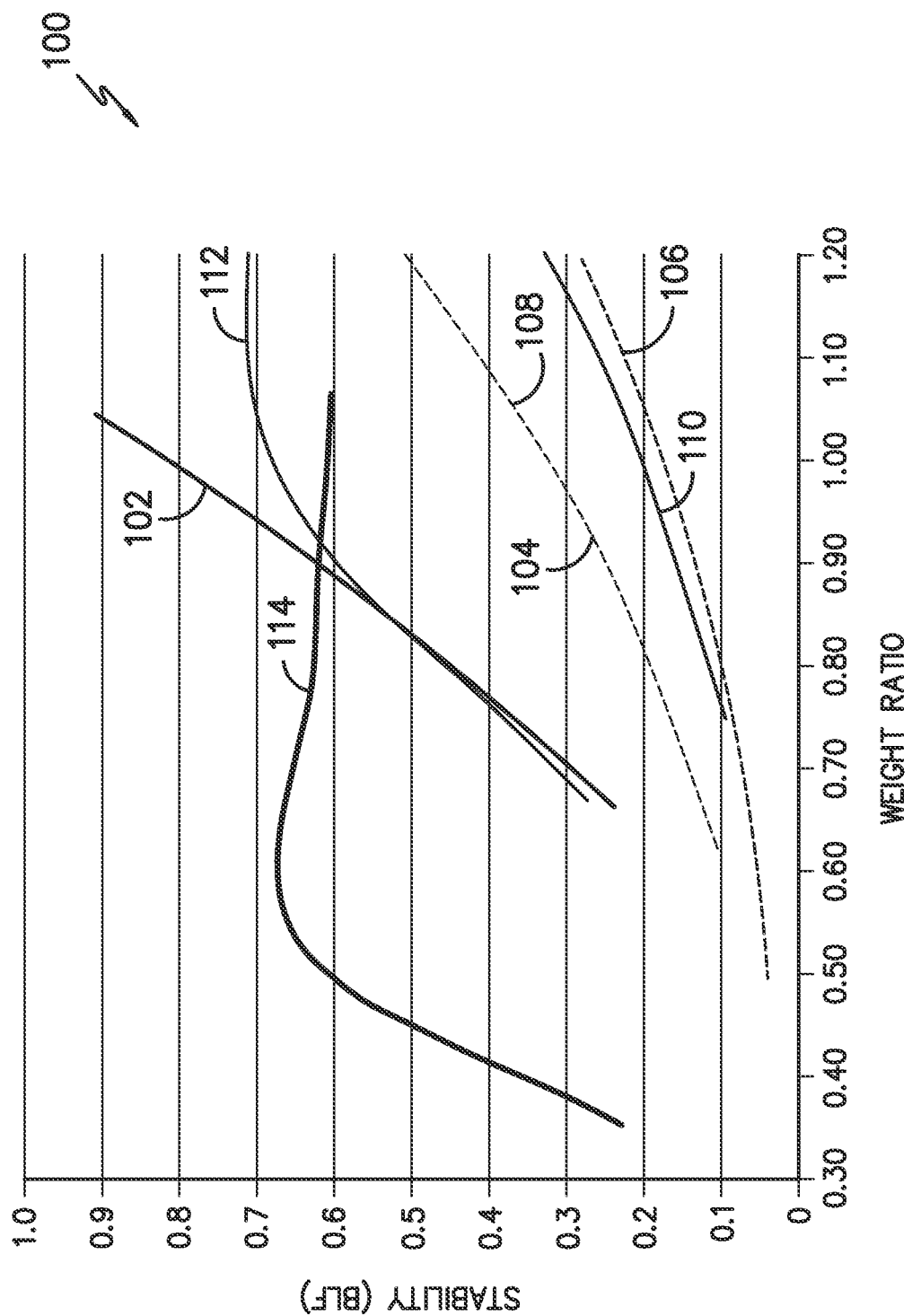
FIG. -22-

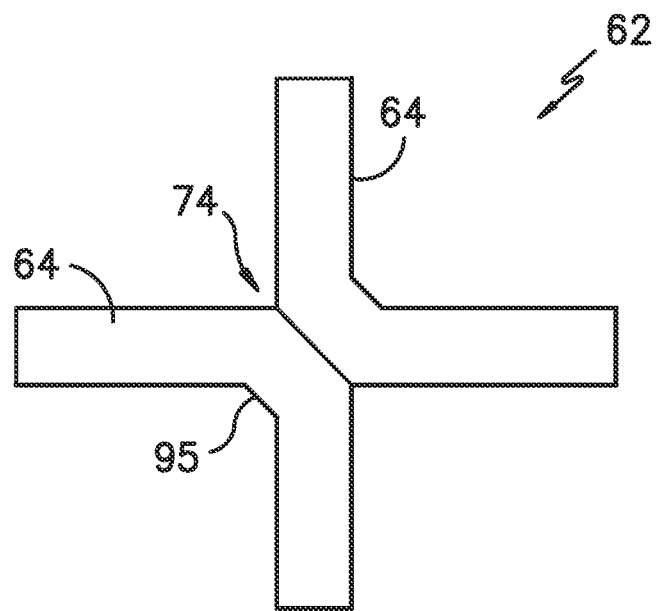
FIG. -23-
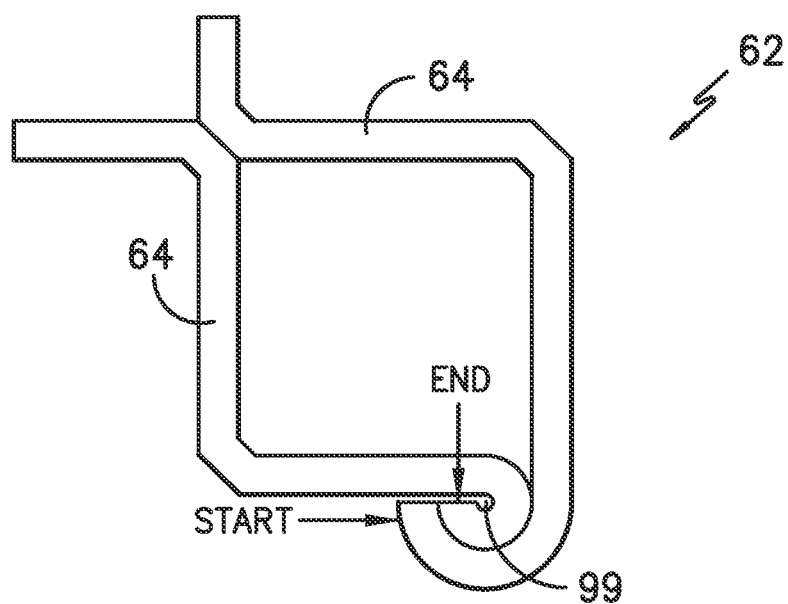
FIG. -24-

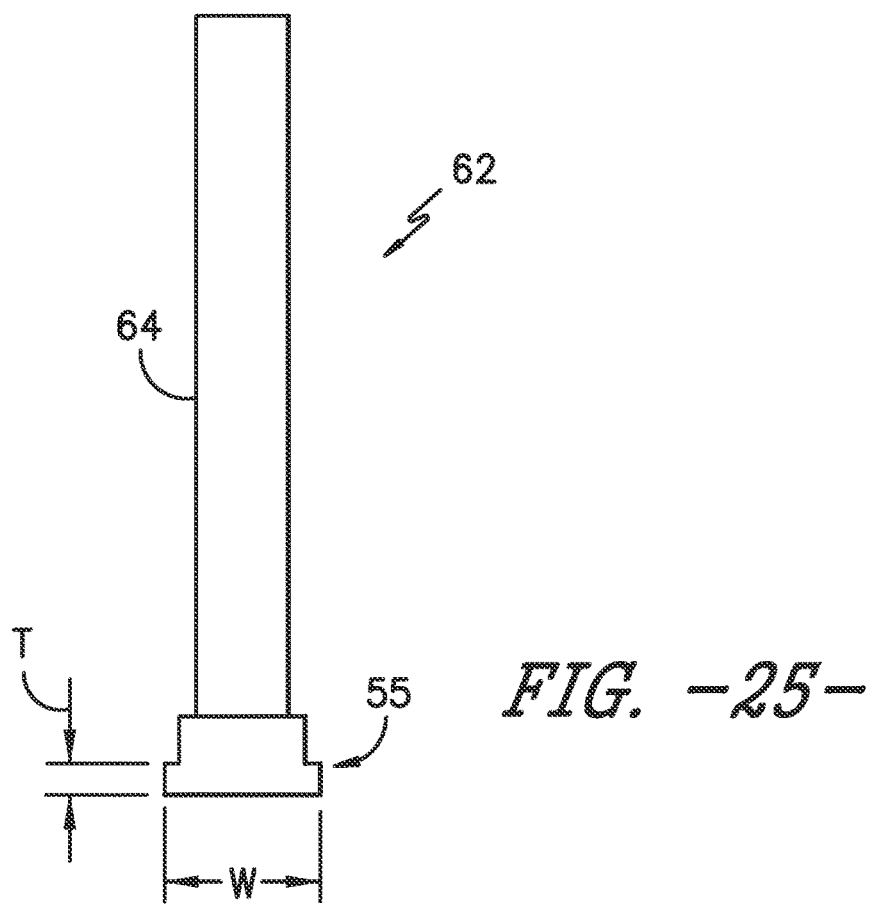
FIG. -25-
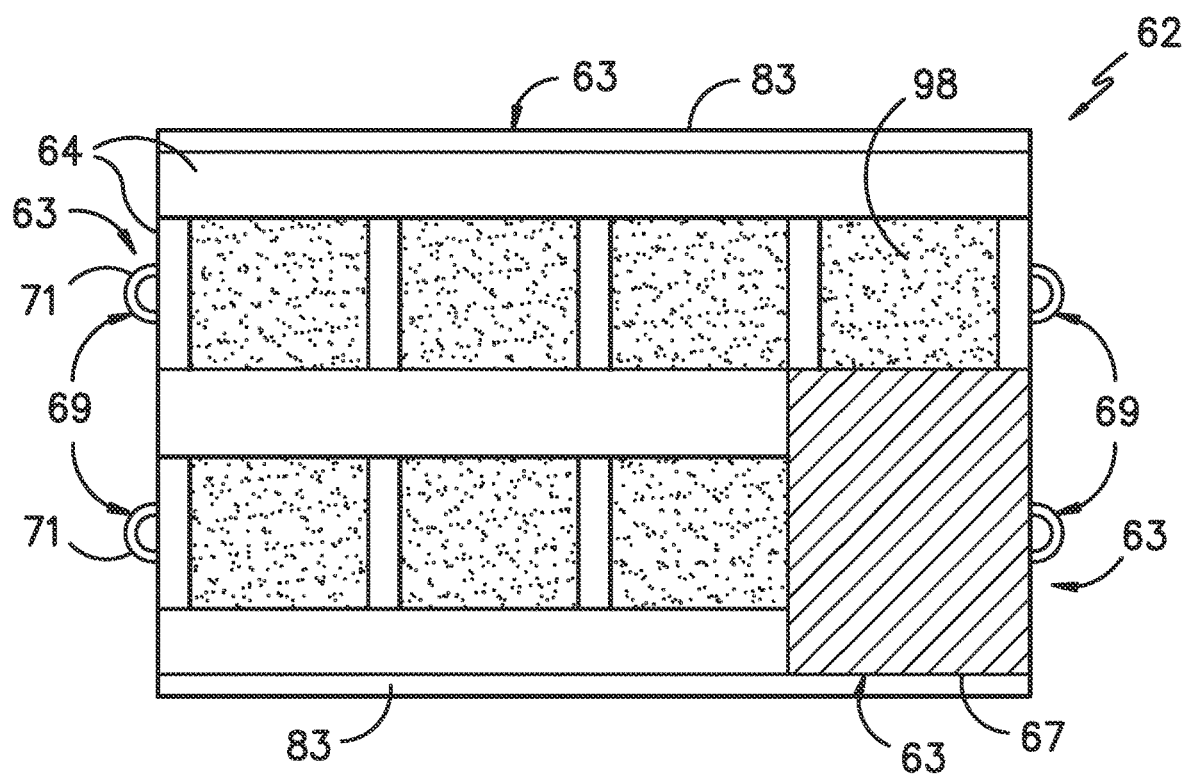
FIG. -26-

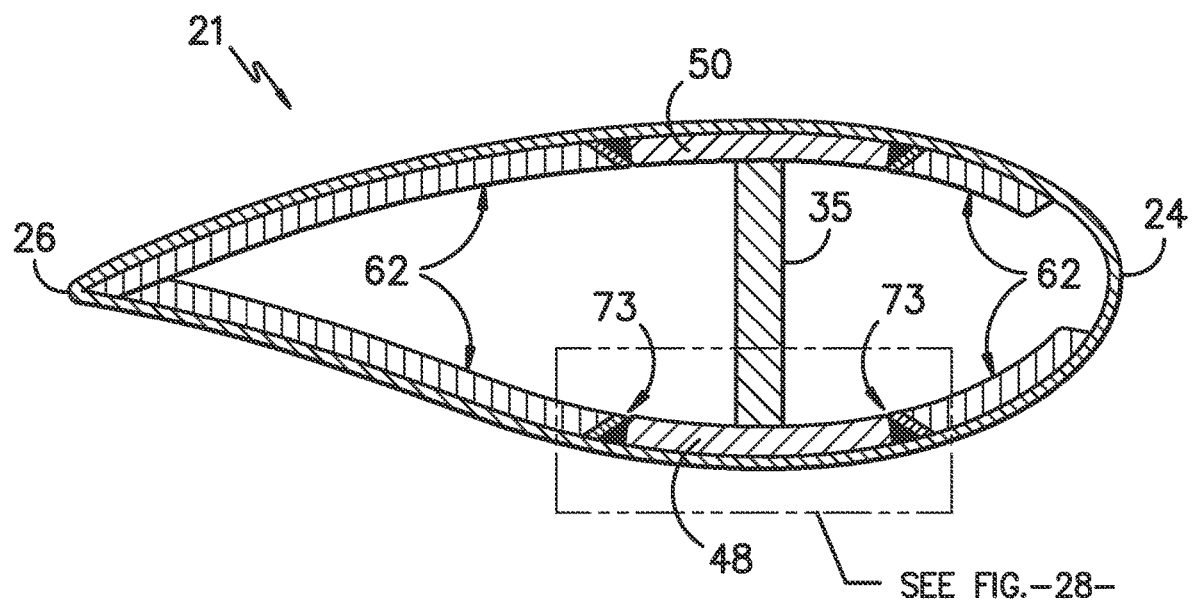
FIG. -27-
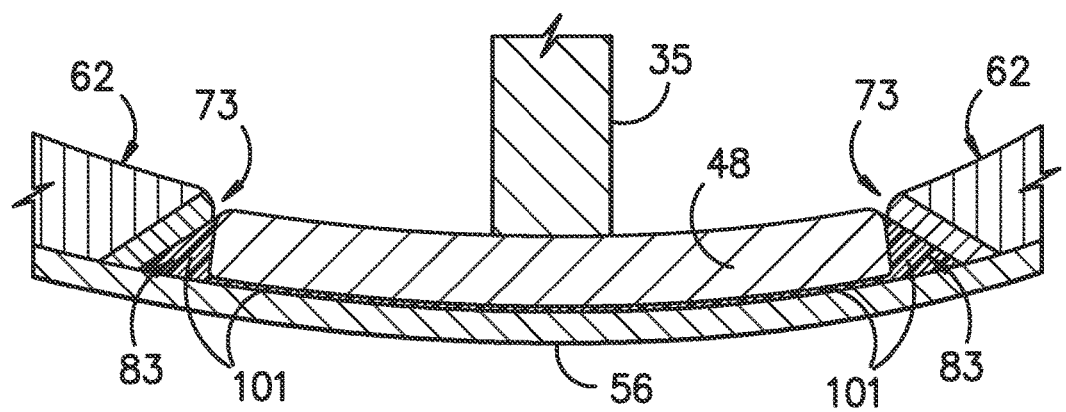
FIG. -28-

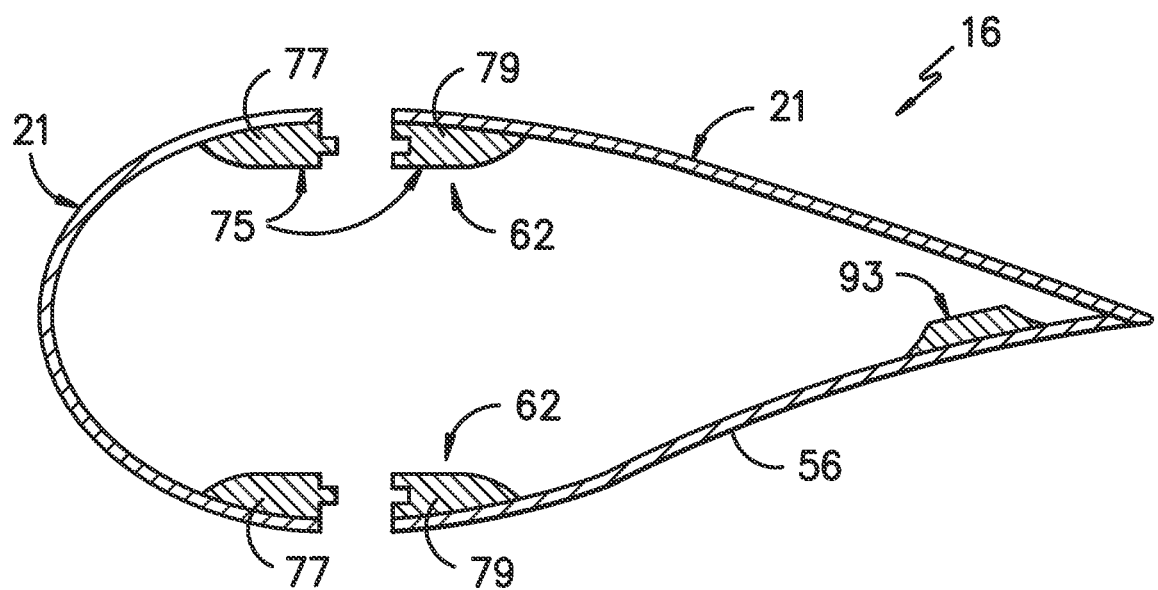
FIG. -29-
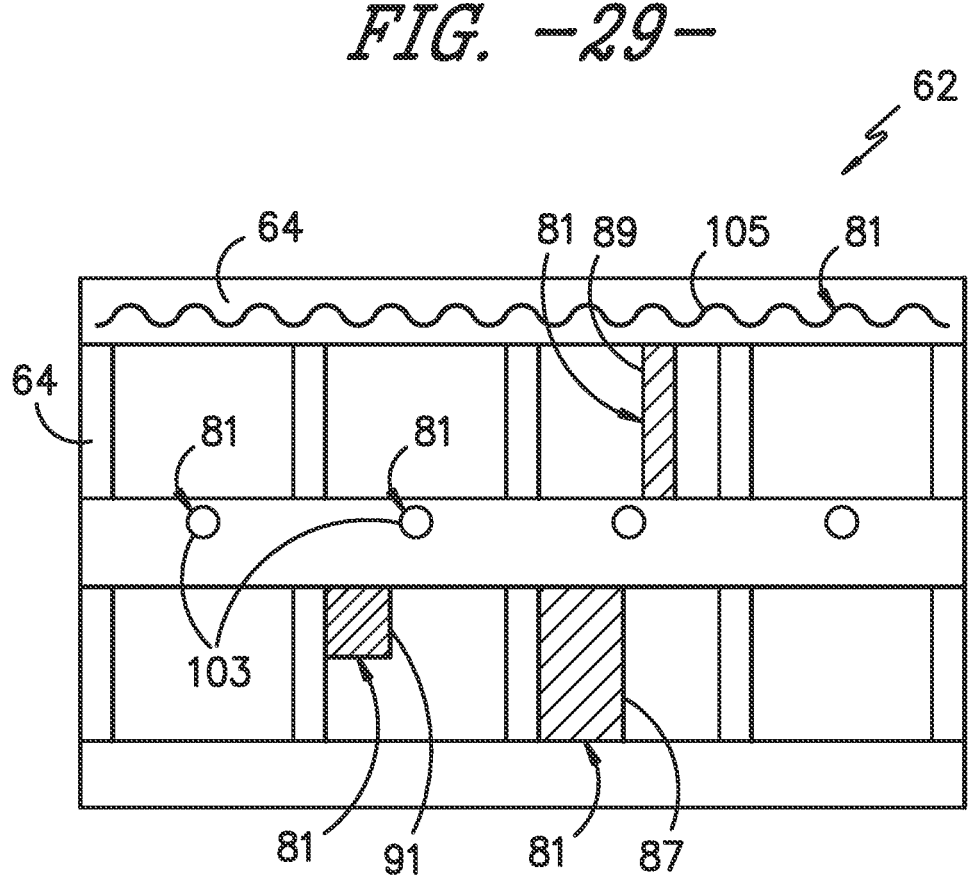
FIG. -30-

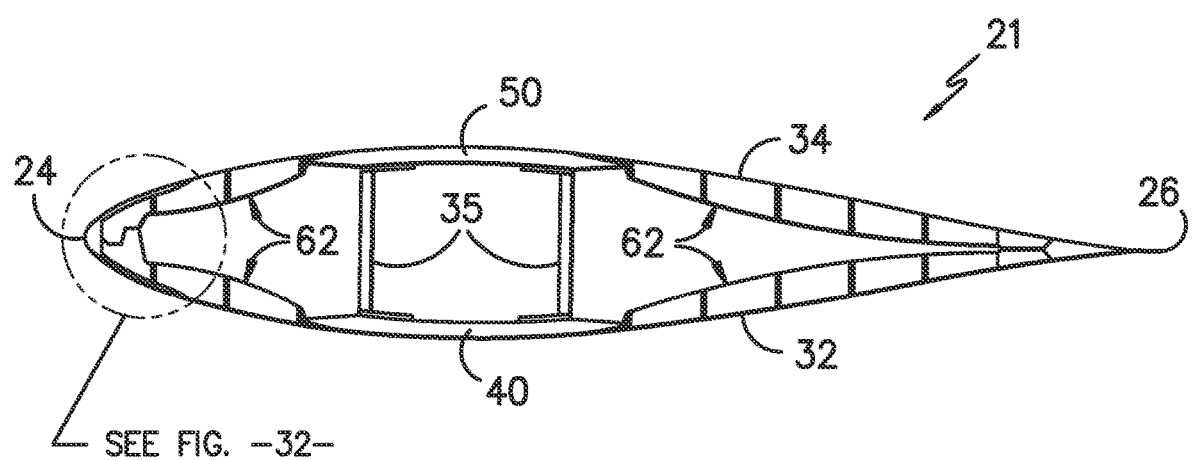
FIG. -31-
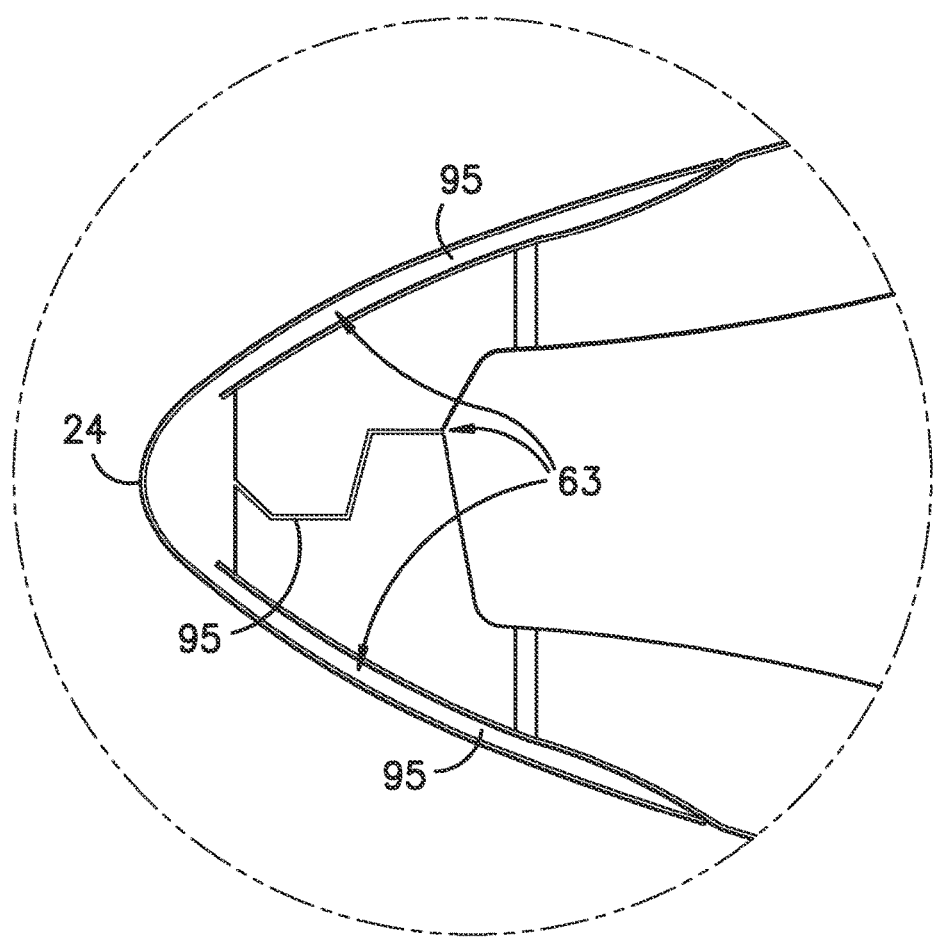
FIG. -32-

APPARATUS FOR MANUFACTURING COMPOSITE AIRFOILS

PRIORITY CLAIM

This application is a continuation application of U.S. application Ser. No. 15/819,042 filed Nov. 21, 2017, which is hereby incorporated by reference in its entirety for all purposes.

FIELD

The present disclosure relates in general to methods and apparatuses of manufacturing composite structures. The present disclosure relates more specifically to methods and apparatuses for manufacturing composite airfoils.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves.

The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin. Accordingly, conventional rotor blades generally have a sandwich panel configuration. As such, conventional blade manufacturing of large rotor blades involves high labor costs, slow through put, and low utilization of expensive mold tooling. Further, the blade molds can be expensive to customize.

Thus, methods for manufacturing rotor blades may include forming the rotor blades in segments. The blade segments may then be assembled to form the rotor blade. For example, some modern rotor blades, such as those blades described in U.S. patent application Ser. No. 14/753,137 filed Jun. 29, 2015 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component.

In view of the foregoing, the art is continually seeking improved methods for manufacturing wind turbine rotor blade panels having printed grid structures.

BRIEF DESCRIPTION

Aspects and advantages of the invention will be set forth in part in the following description, or may be obvious from the description, or may be learned through practice of the invention.

The present disclosure is directed to an apparatus for manufacturing a composite component. The apparatus includes a mold onto which the composite component is formed. The mold is disposed within a grid defined by a first axis and a second axis. The apparatus further includes a first frame assembly disposed above the mold, and a plurality of machine heads coupled to the first frame assembly within the grid in an adjacent arrangement along the first axis. At least one of the mold or the plurality of machine heads is moveable along the first axis, the second axis, or both. At least one of the machine heads of the plurality of machine heads is moveable independently of one another along a third axis.

In one embodiment, each machine head defines a centerline axis at least partially along the third axis. A distance between each adjacent pair of centerline axes of the machine heads corresponds to a desired spacing of a structure of the composite component to be formed.

In various embodiments, the first axis is substantially parallel to a length of the composite component. The second axis is substantially parallel to a width of the composite component. The width is generally perpendicular to the length of the composite component. In still various embodiments, the plurality of machine heads defines a front head and a rear head along the first axis. At least one of the mold or the plurality of machine heads is moveable to dispose at least the front head along the first axis at or beyond the length of the composite component to be formed along a first direction. In one embodiment, at least one of the mold or the plurality of machine heads is moveable to dispose at least the rear head along the first axis at or beyond the length of the composite component to be formed along a second direction opposite of the first direction. In still another embodiment, the plurality of machine heads is arranged along the first axis at least approximately 50% or greater of the length of the composite component to be formed.

In various embodiments, the first axis is substantially parallel to a width of the composite component. The second axis is substantially parallel to a length of the composite component. The width is generally perpendicular to the length of the composite component. In still various embodiments, the plurality of machine heads defines a front head and a rear head along the first axis. At least one of the mold or the plurality of machine heads is moveable to dispose at least the front head along the first axis at or beyond the width of the composite component to be formed along a first direction. In one embodiment, at least one of the mold or the plurality of machine heads is moveable to dispose at least the rear head along the first axis at or beyond the width of the composite component to be formed along a second direction opposite of the first direction. In another embodiment, the plurality of machine heads is arranged along the first axis at least approximately 50% or greater of the width of the composite component to be formed.

In one embodiment, the plurality of machine heads is extended along the first axis equal to or greater than a length or a width of the composite component to be formed onto the mold.

In various embodiments, one or more of the plurality of machine heads is rotatable about a fourth axis independently of one another. In one embodiment, a working end of the one or more machine heads is disposed at an angle relative to the grid, wherein the angle ranges from approximately 0 degrees to approximately 175 degrees. In another embodiment, one or more of the plurality of machine heads is rotatable about a fifth axis. The fifth axis is generally perpendicular to the fourth axis and the second axis.

In various embodiments, the first frame assembly includes a first frame moveable along the first axis and a second frame moveably coupled to the first frame. The plurality of machine heads is moveably coupled to the second frame so as to move along at least one of the first axis, the second axis, or the third axis. In one embodiment, the second frame defines a second plurality of machine heads moveably coupled to the second frame adjacent to the plurality of machine heads on an opposing face of the second frame. One or more of the second plurality of machine heads is moveable independently of one another along the third axis. In another embodiment, the apparatus defines a plurality of the first frame in adjacent arrangement. Each first frame is independently moveable on a base frame along the first axis.

In one embodiment, each of the plurality of machine heads defines at least one of a material deposition tool defining at least one or more of an extruder, a filament dispensing head, a tape deposition head, a paste dispensing head, a liquid dispensing head, or one or more of a curing tool, a material conditioning tool, a material cutting tool, a material removal tool, or a vacuum tool, or combinations thereof.

In another embodiment, at least one or more of the plurality of machine heads is configured to dispense a material from a working end thereof at one or more flow rates, temperatures, and/or pressures independently of one or more other machine heads.

In still another embodiment, one or more of the plurality of machine heads deposits at least of one of varying materials, varying thicknesses, or varying cross-sectional shapes onto an outer skin of the rotor blade panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to an aspect of the present disclosure;

FIG. 2 illustrates a perspective view of one embodiment of a composite component according to an aspect of the present disclosure;

FIG. 3 illustrates an exploded view of the composite component of FIG. 2;

FIG. 4 illustrates a cross-sectional view of one embodiment of a leading edge segment of a composite component according to an aspect of the present disclosure;

FIG. 5 illustrates a cross-sectional view of one embodiment of a trailing edge segment of a composite component according to an aspect of the present disclosure;

FIG. 6 illustrates a cross-sectional view of the composite component of FIG. 2 according to an aspect of the present disclosure along line 6-6;

FIG. 7 illustrates a cross-sectional view of the composite component of FIG. 2 according to an aspect of the present disclosure along line 7-7;

FIG. 8A illustrates a perspective view of one embodiment of an apparatus for manufacturing a composite component, such as the composite component generally illustrated in FIGS. 2-7;

FIG. 8B illustrates a perspective view of one embodiment of an apparatus for manufacturing a composite component, such as the composite component generally illustrated in FIGS. 2-7;

FIG. 8C illustrates a perspective view of one embodiment of an apparatus for manufacturing a composite component, such as the composite component generally illustrated in FIGS. 2-7;

FIG. 8D illustrates a perspective view of the embodiment generally provided in FIG. 8C in an open position of the apparatus for manufacturing a composite component;

FIG. 8E illustrates a side view of a portion of an embodiment of the apparatus generally provided in regard to FIGS. 8A-8F;

FIG. 8F illustrates a perspective view of the embodiments of the apparatus generally provided in FIGS. 8C and 8D further depicting additional embodiments of the apparatus;

FIG. 9A illustrates a perspective view of another embodiment of an apparatus for manufacturing a composite component, such as the composite component generally illustrated in FIGS. 2-7;

FIG. 9B illustrates a perspective view of another embodiment of an apparatus for manufacturing a composite component, such as the composite component generally illustrated in FIGS. 2-7

FIG. 10 illustrates a cross-sectional view of one embodiment of a mold of a composite component, particularly illustrating an outer skin placed in the mold with a plurality of grid structures printed thereto;

FIG. 11 illustrates a perspective view of one embodiment of a grid structure according to an aspect of the present disclosure;

FIG. 12 illustrates a perspective view of one embodiment of a mold of a composite component with an apparatus for manufacturing the composite component positioned above the mold so as to print a grid structure thereto according to an aspect of the present disclosure;

FIG. 13 illustrates a perspective view of one embodiment of a mold of a composite component with an apparatus for manufacturing a composite component positioned above the mold and printing an outline of a grid structure thereto according to an aspect of the present disclosure;

FIG. 14 illustrates a perspective view of one embodiment of a mold of a composite component with an apparatus for manufacturing a composite component positioned above the mold and printing an outline of a grid structure thereto according to an aspect of the present disclosure;

FIG. 15 illustrates a cross-sectional view of one embodiment of a first rib member of a grid structure according to an aspect of the present disclosure;

FIG. 16 illustrates a cross-sectional view of another embodiment of a first rib member of a grid structure according to an aspect of the present disclosure;

FIG. 17 illustrates a top view of one embodiment of a grid structure according to an aspect of the present disclosure;

FIG. 18 illustrates a cross-sectional view of one embodiment of a first rib member and intersecting second rib members of a grid structure according to an aspect of the present disclosure;

FIG. 19 illustrates a cross-sectional view of one embodiment of a second rib member of a grid structure according to an aspect of the present disclosure;

FIG. 20 illustrates a top view of one embodiment of a grid structure according to an aspect of the present disclosure, particularly illustrating rib members of the grid structure arranged in a random pattern;

FIG. 21 illustrates a perspective view of another embodiment of a grid structure according to an aspect of the present disclosure, particularly illustrating rib members of the grid structure arranged in a random pattern;

FIG. 22 illustrates a graph of one embodiment of buckling load factor (y-axis) versus weight ratio (x-axis) of a grid structure according to an aspect of the present disclosure;

FIG. 23 illustrates a partial, top view of one embodiment of a printed grid structure according to an aspect of the present disclosure, particularly illustrating a node of the grid structure;

FIG. 24 illustrates a partial, top view of one embodiment of a printed grid structure according to an aspect of the present disclosure, particularly illustrating a start printing location and an end printing location of the grid structure;

FIG. 25 illustrates an elevation view of one embodiment of a printed rib member of a grid structure according to an aspect of the present disclosure, particularly illustrating a base section of one of the rib members of the grid structure having a wider and thinner cross-section than the remainder of the rib member so as to improve bonding of the grid structure to the outer skins of the composite component;

FIG. 26 illustrates a top view of another embodiment of a grid structure according to an aspect of the present disclosure, particularly illustrating additional features printed to the grid structure;

FIG. 27 illustrates a cross-sectional view of one embodiment of a composite component having a printed grid structure arranged therein according to an aspect of the present disclosure, particularly illustrating alignment features printed to the grid structure for receiving the spar caps and shear web;

FIG. 28 illustrates a partial, cross-sectional view of the composite component of FIG. 25, particularly illustrating additional features printed to the grid structure for controlling adhesive squeeze out;

FIG. 29 illustrates a cross-sectional view of one embodiment of a composite component having printed grid structures arranged therein according to an aspect of the present disclosure, particularly illustrating male and female panel alignment features printed to the grid structure;

FIG. 30 illustrates a top view of yet another embodiment of a grid structure according to an aspect of the present disclosure, particularly illustrating auxiliary features printed to the grid structure;

FIG. 31 illustrates a cross-sectional view of one embodiment of a composite component according to an aspect of the present disclosure, particularly illustrating a plurality of grid structures printed to inner surfaces of the rotor blade panel; and FIG. 32 illustrates a partial, cross-sectional view of the leading edge of the composite component of FIG. 29, particularly illustrating a plurality of adhesive gaps.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to an apparatus and method for manufacturing a composite component, including structures thereof, using automated deposition of materials via technologies such as 3-D Printing, additive manufacturing, automated fiber deposition or tape deposition, as well as other techniques that utilize CNC control and multiple degrees of freedom to deposit material. The apparatus generally includes a mold onto which the composite component is formed. The mold is disposed within a grid defined by a first axis and a second axis generally perpendicular to the first axis. A plurality of machine heads is disposed within the grid in adjacent arrangement along the first axis. The plurality of machine heads is coupled to a first frame assembly. The mold, the plurality of machine heads, or both, is moveable along the first axis and the second axis. Each machine head of the plurality of machine heads is moveable independently of one another along a third axis.

The embodiments of the apparatus and method shown and described herein may improve manufacturing cycle time efficiency, such as by enabling a relatively simple zig-zag, sinusoidal, or orthogonal motion to deposit composite component structures, such as onto a rotor blade panel formed onto a mold. Thus, the methods described herein provide many advantages not present in the prior art. For example, the methods of the present disclosure may provide the ability to easily customize composite component structures having various curvatures, aerodynamic characteristics, strengths, stiffness, etc. For example, the printed or formed structures of the present disclosure can be designed to match the stiffness and/or buckling resistance of existing sandwich panels for composite components. More specifically, composite components defining the exemplary rotor blades and components thereof generally provided in the present disclosure can be more easily customized based on the local buckling resistance needed. Still further advantages include the ability to locally and temporarily buckle to reduce loads and/or tune the resonant frequency of the rotor blades to avoid problem frequencies. Moreover, the structures described herein enable bend-twist coupling of the composite component, such as defining a rotor blade. Furthermore, improved methods of manufacturing, and improve manufacturing cycle time associated therewith, for the improved customized composite component structures may thereby enable cost-efficient production and availability of composite components, including, but not limited to, rotor blades described herein, such as through a higher level of automation, faster throughput, and reduced tooling costs and/or higher tooling utilization. Further, the composite components of the present disclosure may not require adhesives, especially those produced with thermoplastic materials, thereby eliminating cost, quality issues, and extra weight associated with bond paste.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to wind turbines or any particular type of wind turbine configuration. In addition, the present invention is not limited to use with wind turbines, but may be utilized in producing any composite component, such as any application having rotor blades. Further, the methods described herein may also apply to manufacturing any composite component that benefits from printing or laying a structure to a mold. Still further, the methods described herein may further apply to manufacturing any composite component that benefits from printing or laying a structure onto a skin placed onto a mold, which may include, but is not limited to, before the skins have cooled so as to take advantage of the heat from the skins to provide adequate bonding between the printed structure and the skins. As such, the need for additional adhesive or additional curing is eliminated.

Referring now to FIGS. 2 and 3, various views of an exemplary composite component that may be produced by the structures, apparatuses, and methods generally provided herein according to the present disclosure are illustrated. More specifically, an exemplary embodiment of a composite component defining a rotor blade 16 is generally provided. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material.

The thermoplastic rotor blade components and/or materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset components and/or materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

In addition, as mentioned, the thermoplastic and/or the thermoset material as described herein may optionally be reinforced with a fiber material, including but not limited to glass fibers, carbon fibers, polymer fibers, wood fibers, bamboo fibers, ceramic fibers, nanofibers, metal fibers, or similar or combinations thereof. In addition, the direction of the fibers may include multi-axial, unidirectional, biaxial, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a length or span 23 that is equal to the total length between the blade root section 20 and the blade tip section 22. As shown in FIGS. 2 and 6, the rotor blade 16 also defines a width or chord 25 that is equal to the total length between a leading edge 24 of the rotor blade 16 and a trailing edge 26 of the rotor blade 16. As is generally understood, the width or chord 25 may generally vary in length with respect to the length or span 23 as the rotor blade 16 extends from the blade root section 20 to the blade tip section 22.

Referring particularly to FIGS. 2-4, any number of blade segments 21 or panels having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade panels 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Thus, where the blade segments 21 are constructed at least partially of a thermoplastic material, adjacent blade segments 21 can be welded together along the seams 36, 38, 54, which will be discussed in more detail herein. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the length or span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures, solidifies, or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Referring now to FIGS. 8A-8F and FIGS. 9A-9B, the present disclosure is directed to embodiments of an apparatus 200 and methods of manufacturing composite components 210, such as rotor blade panels 21 having at least one printed reinforcement grid structure 62 formed via 3-D printing (e.g., blade segments illustrated in regard to FIGS. 2-7). As such, in certain embodiments, the composite component 210 may include the rotor blade panel 21 further including a pressure side surface, a suction side surface, a trailing edge segment, a leading edge segment, or combinations thereof. 3-D printing, as used herein, is generally understood to encompass processes used to synthesize three-dimensional objects in which successive layers of material are formed under computer control to create the objects. As such, composite components 210 of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

Referring now to FIGS. 8A-8F, an apparatus 200 for manufacturing a composite component 205 is generally provided. The composite component 210 may generally define all or part of the rotor blade 16 or rotor blade panel 21 such as described in regard to FIGS. 2-7. The apparatus 200 includes a mold 58 onto which the composite component 210 is formed. The mold 58 is disposed within a grid 205 defined by a first axis 201 and a second axis 202 generally perpendicular to the first axis 201. A plurality of machine heads 220 disposed within the grid 205 in adjacent arrangement along the first axis 201 or the second axis 202. The plurality of machine heads 220 is coupled to a first frame assembly 230 above the mold 58. The mold 58, the plurality of machine heads 220, or both, is moveable along the first axis 201 and the second axis 202. Each machine head 225 of the plurality of machine heads 220 is moveable independently of one another along a third axis 203.

In the embodiment generally provided in FIGS. 8A and 8B, each machine head 225 of the plurality of machine heads 220 is disposed in an adjacent arrangement along the first axis 201. The first axis 201 may generally correspond to at least a length or span 23 (FIG. 2) of the composite component 210, such as embodiments of the rotor blade 16 or rotor blade panel 21 described in regard to FIGS. 2-7. For example, the first axis 201 may be substantially parallel to the span 23 (FIG. 2) of the rotor blade panel 21. In one embodiment, the first axis 201 is approximately parallel, plus or minus 10%, of the first axis 201.

The second axis 202 may generally correspond to at least a width or chord 25 (FIG. 2) of the composite component 210, such as embodiments of the rotor blade 16 or rotor blade panel 21 described in regard to FIGS. 2-7. For example, the second axis 202 may be substantially parallel to the width or chord 25 (FIG. 2) of the rotor blade panel 21. The width or chord 25 of the composite component 210 is generally perpendicular to the length or span 23 of the composite component 210. In one embodiment, the second axis 202 is approximately parallel, plus or minus 10% of the second axis 202.

In various embodiments, the first frame assembly 230 may generally define a gantry system such as to articulate the plurality of machine heads 220 along the first axis 201 and the second axis 202. In various embodiments, the plurality of machine heads 220 defines a front head 221 and a rear head 222 along the first axis 201. In one embodiment, the plurality of machine heads 220 is arranged along the first axis 201 at least approximately 50% or greater of the length 23 of the composite component 210 to be formed by the apparatus 200. In still other embodiments, the plurality of machine heads 220 is arranged along the first axis 201 at least approximately 70% or greater of the length 23 of the composite component 210 to be formed by the apparatus 200. In still yet other embodiments, the plurality of machine heads 220 is arranged along the first axis 201 at least approximately 100% or greater of the length 23 of the composite component 210 to be formed by the apparatus 200. In various embodiments (e.g., FIG. 8A), the plurality of machine heads 220 may extend at least the entire length or span 23, or greater, of the mold 58 or composite component 210 to be formed.

In the embodiment generally provided in FIGS. 8A through 8D, at least the mold 58 or the plurality of machine heads 220 is moveable to dispose (e.g., position, place, or arrange) at least the front head 221 along the first axis 201 beyond the length or span 23 of the composite component 210 along a first direction 211. Furthermore, the mold 58, the plurality of machine heads 220, or both, is moveable to dispose at least the rear head 222 along the first axis 201 beyond the length or span 23 (FIG. 2) of the composite component 210 (e.g., defining the rotor blade panel 21) along a second direction 212 opposite of the first direction 211.

Referring now to the embodiment generally provided in FIG. 8B, at least a portion of the first frame assembly 230 may be moveable along the second axis 202 greater than the width or chord 25 of the composite component 210, such as defining the rotor blade panel 21. For example, the plurality of machine heads 220 may be moveable greater than the width or chord 25 of a first composite component 213. The plurality of machine heads 220 may be disposed over a second composite component 214 disposed adjacent to the first composite component 213 along the second axis 202. As such, the apparatus 200 may enable the plurality of machine heads 220 to proceed to print and deposit one or more rib structures 64 (FIGS. 10-32) the second composite component 214 while the rib structures 64 at first composite component 213 solidify or cure upon the outer skin 56. In various embodiments, a second frame 232 of the first frame assembly 230 is moveable to place, position, or otherwise dispose the plurality of machine heads 220 at least equal to or greater than the width or chord 25 of the composite component 210.

Referring now to the embodiment generally provided in FIG. 8B, the first frame assembly 230 may further define a supporting member 236 extended along the second axis 202. The supporting member 236 may generally define a portion of the first frame assembly 230 such as to provide structural support to the plurality of machine heads 220. For example, the supporting member 236 may mitigate curvature or sagging of the plurality of machine heads 220 across the spanwise adjacent arrangement. The supporting member 236 may generally partition the plurality of machine heads 236 into a plurality of the plurality of machine heads 236, such as each are supported to a separate or independently moveable second frame 232, such as further described below.

Referring now to FIGS. 8A-8E, the first frame assembly 230 may include a first frame 231 movable along the first axis 201 and a second frame 232 coupled to the first frame 231. The first frame 231 may generally be coupled to a base frame 235 permitting articulation or movement along the first axis 201. The base frame 235 may generally define a rail assembly, track structure, glide, automated guide vehicle (AGV), or other configuration enabling the first frame 231 to move along the first axis 201. In the embodiment generally provided in FIG. 8A, the plurality of machine heads 220 is moveably coupled to the second frame 232 such that the plurality of machine heads 220 is moveable generally in unison along the first axis 201, the second axis 202, or both. As described in regard to FIG. 8B, the second frame 232 may be moveable along the second axis 202 such as to place, position, arrange, or otherwise dispose the plurality of machine heads 220 at least along the entire width or chord 25 of the composite component 210. Still further, the second frame 232 may be moveable along the second axis 202 such as to dispose the plurality of machine heads 220 proximate to the second composite component 214 (e.g., vertically over the second composite component 214 along the third axis 203).

The second frame 231 further enables movement of at least one machine head 225 along the third axis 203 independent of another machine head 225. The third axis 203 generally corresponds to a vertical distance over the grid 205. More specifically, the third axis 203 corresponds to a vertical distance over the rotor blade panel 21. As such, each machine head 225 of the plurality of machine heads 220 is moveable independently of one another along the third axis 203 to independently define a vertical distance over the grid 205, or more specifically, the rotor blade panel 21.

Referring now to the embodiments generally provided in FIGS. 8C and 8D, a plurality of the first frame 231 may be disposed on the base frame 235. Each first frame 231 may be independently moveable on the base frame 235. For example, each first frame 231 may be independently moveable along the first axis 201. In various embodiments, each first frame 231 may be independently moveable along the first axis 201 in opposite directions (e.g., one or more first frames 231 toward the first direction 211 and another or more first frames 231 toward the second direction 212).

As another example, in reference to the embodiment generally provided in FIGS. 8C and 8D, the first frame 231 may further displace along the first axis 201 such as to provide vertical clearance along the third axis 203 relative to one or more of the composite components 210. In various embodiments, the first frame assembly 230 defines a plurality of the first frame 231 to which one or more of the second frame 232 is attached to each of the first frame 231. For example, referring to FIG. 8C, one of the first frame 231a may translate or move along the first axis 201 on the base frame 235 to position the plurality of machine heads 220 and the first frame 231a away from one or more of the composite components 210, such as generally depicted at the first frame 231b in FIG. 8D.

For example, the first frame assembly 230 may displace, translate, or otherwise move to apply the outer skin 56 onto the mold 58, and for removing the composite component 210 such as the rotor blade panel 21 from the mold 58 at least partially along the third axis 203. As another example, one or more of the first frame 231 of the first frame assembly 230, such as the first frame 231a depicted in FIG. 8C, may translate such as depicted at the first frame 231b in FIG. 8D, to enable movement of another first frame 231, such as depicted at 231c in FIG. 8D, to translate along the first axis 201. In various embodiments, the plurality of machine heads 220 at one of more of the first frame 231 (e.g., 231a, 231b, 231c) may define varying combinations of machine heads 225 such that one first frame 231 (e.g., 231c) may translate over one or more molds 58 to perform a function specific to one first frame 231 in contrast to another first frame 231 (e.g., 231a, 231b). Referring now to FIGS. 9A and 9B, further exemplary embodiments of the apparatus 200 are generally provided. The embodiments generally provided in FIGS. 9A and 9B may be configured substantially similarly as shown and described in regard to FIGS. 8A, 8B, 8C, and 8D. In the embodiments generally provided in FIGS. 9A and 9B, the first axis 201 may generally correspond to a width or chord 25 (FIG. 2) of composite component 210 and the second axis 202 may generally correspond to a length or span 23 (FIG. 2) of the composite component 210. For example, in various embodiments, the first axis 201 is substantially parallel to at least a width or chord 25 (FIG. 2) of the rotor blade panel 21. The second axis 202 is substantially parallel to at least a length or span 23 (FIG. 2) of the rotor blade panel 21. In one embodiment, the mold 58, the plurality of machine heads 220, or both, is moveable to dispose at least the front head 221 along the first axis 201 greater than the width or chord 25 of the rotor blade panel 21 along the first direction 211.

In the embodiment generally provided in FIGS. 9A and 9B, the mold 58, the plurality of machine heads 220, or both, is moveable to dispose at least the rear head 222 along the first axis 201 beyond the width or chord 25 (FIG. 2) of the rotor blade panel 21 along a second direction 212. As such, the plurality of machine heads 220 occupies at least the entire length or span 23 of the rotor blade panel 21 to deposit materials for one or more structures of the rotor blade panel 21 such as described in regard to FIGS. 2-7. Still further, the plurality of machine heads 220 is moveable to provide vertical clearance over the mold 58, the rotor blade panel 21, or both to enable access to the mold 58 and/or the rotor blade panel 21 from at least partially along the third axis 203.

Referring still to the exemplary embodiments generally provided in FIGS. 8A, 8B, 8C, 8D, 8E, 9A, and 9B, the apparatus 200 may further define a fourth axis 204. The fourth axis 204 is generally defined at the plurality of machine heads 220. For example, referring more specifically to the embodiment generally provided in FIG. 8E, the fourth axis 204 is generally defined by the axis upon which the plurality of machine heads 220 is arranged (e.g., the first axis 201 shown in FIGS. 8A-8D) and a vertical distance along the third axis 203. The fourth axis 204 generally defines an axis about which one or more of the machine heads 225 may rotate or pivot independently of one another. For example, each machine head 225 generally defines a working end 227 proximate to the composite component 210 (e.g., a grid structure 62 of the rotor blade panel 21). The plurality of machine heads 220 is configured to dispose the working end 227 of one or more of the machine heads 225 at an angle 228 relative to the grid 205, the mold 58, or both.

In various embodiments, the apparatus 200, such as at the second frame 232, at the plurality of machine heads 220, or both, is configured to move or pivot along the fourth axis 204 to dispose the working end 227 of one or more machine heads 225 at an angle relative to the grid 205 between approximately 0 degrees and approximately 175 degrees.

Referring still to FIG. 8E, in another embodiment, the apparatus 200 may further define a fifth axis 206 around which one or more of the machine heads 225 may rotate. The fifth axis 206 is generally defined perpendicular to the fourth axis 204 and the second axis 202. The fifth axis 206 is further generally defined through each machine head 225 such as to define a machine head centerline axis, such as generally depicted in FIG. 8A. In one embodiment, the machine head 225 may rotate approximately 360 degrees around the fifth axis 206. More specifically, the working end 227 of each machine head 225 may rotate approximately 360 degrees around the fifth axis 206.

Referring back to FIG. 8A, each machine head 225 may define the machine head centerline axis 226 at least partially along third axis 203. Each adjacent pair of centerline axes 226, 226a may define a distance 224 corresponding to a desired spacing of a structure of the composite component 210 to be formed onto the mold 58. In various embodiments, the center to center distance 224 of each machine head 225 may generally correspond to a desired spacing or multiple of the desired spacing of a desired rib member 64 (FIG. 17) to be formed by the apparatus 200, such as further described herein. More specifically, in various embodiments, the center to center distance 224 of each pair of machine heads 225 may generally correspond to a spacing or distance 97 of the grid structure 62 (FIG. 17).

For example, the spacing or distance 97 of the grid structure 62 may correspond to a spacing or distance between each pair of rib members 64 along a first direction 76 or second direction 78. Still further, the spacing or distance 97 of the rib members 64 may refer to a spacing or distance between each pair of first rib members 66 or second rib members 68. As another example, each structure of the composite component 210 to be formed may define a dimension X of length or width (e.g., spacing or distance 97 shown in FIG. 17). The desired center to center spacing (i.e., the distance 224) of each adjacent pair of machine heads 225 may be at least approximately equal the dimension X of the structure. As another example, the desired center to center spacing (i.e., the distance 224) of each adjacent pair of machine heads 225 may be at least approximately a multiple of the dimension X of the structure. For example, the center to center spacing may be two times (i.e., 2X), or three time (i.e., 3X), or four times (i.e., 4X), etc. of the dimension of the structure. As still another example, the plurality of machine heads 225 may generally move along a first direction (e.g., first direction 211 depicted in FIGS. 8A-8F or FIGS. 9A-9B) to form the structure, and then move along a second direction (e.g., second direction 212 depicted in FIGS. 8A-8F or FIGS. 9A-9B) opposite of the first direction to further form the structure.

As yet another example, when the plurality of machine heads 220 are generally parallel with the length 23 of the composite component 210, such as generally depicted in FIGS. 8A-8F, the center to center spacing or distance 224 along the first axis 201 may generally correspond to or at least approximately equal the desired spacing or distance 97 of the grid structure 62 generally depicted in FIG. 17 along a direction corresponding to the first axis 201. As still another example, when the plurality of machine heads 220 are generally parallel with the width 25 of the composite component 210, such as generally depicted in FIGS. 9A-9B, the center to center spacing or distance 224 along the first axis 201 may generally correspond to or at least approximately equal the desired spacing or distance 97 of the grid structure 62 generally depicted in FIG. 17 along another direction corresponding to the first axis 201. Still further, as previously described, the center to center spacing or distance 224 may be a multiple of the spacing or distance 97 of the grid structure 62. In one embodiment, the center to center spacing or distance 224 may be more specifically an integer multiple of the spacing or distance 97 of the grid structure 62.

Furthermore, the spacing 97 of the grid structure 62 along a second direction (e.g., second direction 212 along the first axis 201 to which the plurality of machine heads 220 is aligned) is modifiable via the instructions at the controller of the apparatus 200 as the center to center spacing 97 of the grid structure 62 along the opposite direction (e.g., first direction 211) is generally independent of the center to center spacing or distance 224 of the machine heads 225 when moving the plurality of machine heads 220 along the same direction in which the plurality of machine heads 220 is aligned.

It should further be noted that the spacing or distance 97 of the grid structure 62 along a second direction opposite of the first direction may be modified via instructions at the controller (e.g., computer numeric control) of the apparatus 200 as the formed structure (e.g., second member 68, FIG. 17) along the second direction may generally be independent of another structure (e.g., first member 66, FIG. 17) along the first direction relative to the spacing 97 between each pair of members.

Referring to FIG. 8E, in another embodiment, the apparatus 200 further defines a second plurality of machine heads 220a adjacent to the plurality of machine heads 220 coupled to the second frame 232. For example, the second plurality of machine heads 220a may be disposed on an opposing or another side or face of the second frame 232 such disposing the second plurality of machine heads 220a adjacent to the plurality of machine heads 220 along the second axis 202. As previously described, the second plurality of machine heads 220a may be independently moveable along the third axis 203 relative to the plurality of machine heads 220. Still further, each machine head 225 may be independently moveable along the third axis 203 relative to another machine head 225.

In various embodiments, such as generally provided in FIG. 8E, two or more of the machine heads 225 may operate in together to print or deposit a material, fluid, or both, to the mold 58. For example, the machine head 225 of the plurality of machine heads 220 may deposit or extrude a first resin material to form a grid structure 62 of the composite component 210. The machine head 225 of the second plurality of machine heads 220A may deposit or extrude a second resin material, same as or different from the first resin material. As another example, the machine head 225 of the second plurality of machine heads 220A may provide a flow of fluid, such as air, inert gas, or liquid fluid, to clear or clean the surface onto which the grid structure 62 is formed. In another embodiment, the machine head 225 of the second plurality of machine heads 220A may provide a heat source such as to aid curing of the resin material deposited onto the surface. In still another embodiment, the machine head 225 may define a surface preparation tool, such as an abrasion tool, deburr tool, or cleaning tool.

Referring now to FIGS. 9A and 9B, further embodiments of the apparatus 200 are generally provided. The embodiments generally provided in regard to FIGS. 9A and 9B are configured substantially similarly as one or more of the embodiments shown and described in regard to FIGS. 8A-8F. However, in FIGS. 9A and 9B, the first axis 201 is substantially parallel to the width or chord 25 of the composite component 210 (e.g., the rotor blade panel 21). The second axis 202 is further defined substantially parallel to the length or span 23 of the composite component 210. The plurality of machine heads 220 are in adjacent arrangement along the first axis 201, such as to extend generally along the width or chord 25 of the composite component 210.

Referring still to FIGS. 9A and 9B, the first frame assembly 230 may generally include a plurality of the second frame 232 to which the plurality of machine heads 220 are attached to each. For example, the plurality of second frames 232 may each be independently moveable along the second axis 202 (e.g., along the length or span 23 of the rotor blade panel 21), such as generally depicted in FIG. 9B. Furthermore, the plurality of machine heads 220 coupled to each second frame 232 may each be independently moveable along the first axis 201 (e.g., along the width or chord 25 of the rotor blade panel 21). Referring now to FIG. 9B, one or more of the plurality of machine heads 220 coupled to each second frame 232 may be moveable away from the mold 58 or composite component 210 such as to provide an opening or vertical clearance along the third axis 203. The clearance or opening may enable placement and removal of the mold 58, the outer skin 56, or both, such as described in regard to FIGS. 8A-8F.

In various embodiments, the plurality of machine heads 220 may be arranged along the first axis 201 at least approximately 50% or greater of the width 25 of the composite component 210 to be formed by the apparatus 200. In still other embodiments, the plurality of machine heads 220 is arranged along the first axis 201 at least approximately 70% or greater of the width 25 of the composite component 210 to be formed by the apparatus 200. In still yet other embodiments, the plurality of machine heads 220 is arranged along the first axis 201 at least approximately 100% or greater of the width 25 of the composite component 210 to be formed by the apparatus 200. In other embodiments (e.g., FIG. 9A), the plurality of machine heads 220 may extend at least the entire width or chord 25, or greater, of the mold 58 or composite component 210 to be formed.

In one embodiment, the plurality of machine heads 220, the mold 58, or both, is moveable to dispose at least the front head 221 along the first axis 201 beyond the width or chord 25 of the composite component 210 to be formed along the first direction 211. In another embodiment, the mold 58, the plurality of machine heads 220, or both, is moveable to dispose at least the rear head 222 along the first axis 201 beyond the width or chord 25 of the composite component 210 along the second direction 212 opposite of the first direction 211. For example, the plurality of machine heads 220 is moveable along the first axis 201 such as dispose one or more of the machine heads 225 proximate to (e.g., adjacent or vertically over) the mold 58, the composite component 210, or both, along the first axis 201. The second frame 232 is moveable along the second axis 202 to dispose the plurality of machine heads 220 along the length or span 23 of the composite component 210. One or more of the second frame 232 may be utilized to be moveable to encompass at least the entire length or span 23 of the composite component 210.

Referring still to the embodiments generally provided in FIGS. 8A-8F and FIGS. 9A-9B, the apparatus 200 may further include a controller configured to control operation of the apparatus 200. The controller, the plurality of machine heads 220, and the first frame assembly 230 may together define a computer numeric control (CNC) device. In another embodiment, the controller, the plurality of machine heads 220, the first frame assembly 230, and the second frame assembly 240 together define a CNC device. In various embodiments, one or more of the machine heads 225 of each plurality of machine heads 220 may define a material deposition tool defining at least one or more of an extruder, a filament dispensing head, a tape deposition head, a paste dispensing head, a liquid dispensing head, or one or more of a curing tool, a material conditioning tool, or a vacuum tool. At least one or more of the plurality of machine heads 220 is configured to dispense a material from at least one machine head 225 at one or more flow rates, temperatures, and/or pressures independently of one or more other machine heads 225. Still further, the material conditioning tool may include a surface preparation tool, such as a cleaning or polishing device, a deburr tool, or other abrasion tool, such as a grinding machine head. The vacuum tool may include a vacuum to remove debris, fluid, chips, dust, shavings, excess material in general, or foreign matter in general.

It should further be appreciated that the embodiments of the apparatus 200 may include the controller further including one or more processors and one or more memory devices utilized for executing at least one of the steps of the embodiments of the method described herein. The one or more memory devices can store instructions that when executed by the one or more processors cause the one or more processors to perform operations. The instructions or operations generally include one or more of the steps of embodiments of the method described herein. The instructions may be executed in logically and/or virtually separate threads on the processor(s). The memory device(s) may further store data that may be accessed by the processor(s). The apparatus 200 may further include a network interface used to communicate, send, transmit, receive, or process one or more signals to and from the controller and to/from at least one of the first frame assembly 230, the second frame assembly 240, the mold 58, or the plurality of machine heads 220.

The present disclosure is further directed to methods for manufacturing composite components 210 having at least one printed reinforcement grid structure 62 formed via 3-D printing, or composite tape deposition reinforcement grid structure 62, or combinations thereof. As such, in certain embodiments, the composite structure 210 may define the rotor blade panel 21 such as described in regard to FIGS. 2-7. The rotor blade panel 21 may include a pressure side surface, a suction side surface, a trailing edge segment, a leading edge segment, or combinations thereof. 3-D printing, as used herein, is generally understood to encompass processes used to synthesize three-dimensional objects in which successive layers of material are formed under computer control to create the objects. As such, objects of almost any size and/or shape can be produced from digital model data. It should further be understood that the methods of the present disclosure are not limited to 3-D printing, but rather, may also encompass more than three degrees of freedom such that the printing techniques are not limited to printing stacked two-dimensional layers, but are also capable of printing curved shapes.

Referring now to FIG. 8F, the embodiment of the apparatus 200 generally provided is configured substantially similarly to one or more of the embodiments shown or described in regard to FIGS. 8A-8E. However, in FIG. 8F, the apparatus 200 further includes a second frame assembly 240 at least partially surrounding the first frame assembly 230. The second frame assembly 240 includes a first axis frame 241 extended at least partially along the first axis 201 and a second axis frame 232 extended at least partially along the second axis 202. An extendable third axis member 243 is coupled to the second axis frame 242. A holding device 245 is coupled to the third axis member 243. The holding device 245 is configured to couple to the outer skin 56, the mold 58, or both, for movement or translation to the grid 205 vertically under the plurality of machine heads 220 along one or more of the first axis 201, the second axis 202, or the third axis 203.

In various embodiments, the holding device 245 is configured to affix to and release from an outer skin 56 to place or remove from the mold 58 at the grid 205. In one embodiment, the holding device 245 defines a vacuum/pressure tool. For example, the holding device 245 may apply a vacuum against the outer skin 56 such as to generate a suction force that affixes the outer skin 56 onto the holding device 245. The second frame assembly 240 translates the holding device 245 along at least one of the first axis 201 and the second axis 202 and extends along the third axis 203 to place the outer skin 56 onto the mold 58. The holding device 245 may further discontinue vacuum to release the outer skin 56 onto the mold 58. In various embodiments, the holding device 245 may further apply a vacuum through the outer skin 56, such as through one or more openings, to generate a suction force pulling the outer skin 56 to the mold 58. The holding device 245 may further apply a pressure, such as a force of air or inert gas, or press upon the outer skin 56 such as by extending the third axis member 243 toward the mold 58 along the third axis 203. For example, applying pressure upon the outer skin 56 and the mold 58 seals at least a perimeter of the outer skin 56 onto the mold 58. In other embodiments, the mold 58 may include a vacuum tool or vacuum line to generate a suction force pulling the outer skin 56 onto the mold 58.

In one embodiment, the holding device 245 may further apply thermal energy (e.g., heat) to at least a portion of the outer skin 56 such as to enable the outer skin 56 to at least substantially conform to a contour of the mold 58. For example, heating at least a portion of the fiber-reinforced outer skin 56 may generally include heating at least a portion of the outer skin 56 to at least a first temperature threshold. In various embodiments, the first temperature threshold defines a temperature at least approximately between a glass transition temperature of the resin material and a melting temperature of the resin material of the fiber reinforced outer skin 56.

In various embodiments, applying thermal energy to the outer skin 56 via the holding device 245 may occur before applying pressure or vacuum to the outer skin 56 to affix to the mold 58. In other embodiments, applying thermal energy to the outer skin 56 may occur at least approximately simultaneously as applying pressure or vacuum to the outer skin 56 to affix to the mold 58. In still other embodiments, applying thermal energy to the outer skin 56 may occur after applying pressure or vacuum to the outer skin 56 to affix the outer skin 56 to the mold 58.

Another embodiment of the method of manufacturing the composite component 210 includes manufacturing a plurality of the composite components 210. The method includes the steps generally described above in regard to FIGS. 8A-8F and FIGS. 9A-9B. The method may further include placing a second fiber-reinforced outer skin 56a onto a second mold 58a via the holding device 245. The second mold 58a is generally disposed adjacent to the first mold 58, such as adjacent along the first axis 201 or the second axis 202, such as generally shown and described in regard to FIGS. 8C, 8D, and 8F.

The method generally includes heating at least a portion of the second fiber-reinforced outer skin 56a to at least a first temperature threshold, applying pressure onto the second outer skin 56a and the second mold 58a to seal at least a perimeter of the second outer skin 56a onto the second mold 58a, and forming a plurality of rib members 62 at the second outer skin 56a, such as described in regard to the first outer skin 56.

It should be appreciated that the method generally includes translating, via the first frame assembly 230 the plurality of machine heads 220 along one or more of the first axis 201, the second axis 202, or the third axis 203 proximate to the first outer skin 56, such as to print, apply, or deposit the resin material to form the grid structure 56 or to prepare the surface of the outer skin 56 (e.g., clean, machine, remove material, apply heat, apply cooling fluid, etc.). Approximately concurrently, or serially, the second frame assembly 240 may translate the holding device 245 along the first axis 201, the second axis 202, or the third axis 203 to dispose the second outer skin 56a proximate to the mold 58a when the plurality of machine heads 220 is proximate to the first outer skin 56 at the first mold 58. As such, the second frame assembly 240 and holding device 245 may operate on the second outer skin 56a and the second mold 58a while another composite component 210 of the first outer skin 56 is being developed.

The method may further include translating, via the first frame assembly 230, the plurality of machine heads 220 along one or more of the first axis 201, the second axis 202, or the third axis 203 proximate to the second outer skin 56a at the second mold 58a and translating, via the second frame assembly 240, the holding device 245 to the first mold 58 when the plurality of machine heads 220 is proximate to the second outer skin 56a at the second mold 58a. As such, the holding device 245 may proceed to remove or otherwise operate on the first outer skin 56 from the first mold 58 via the holding device 245. Following completion of the composite component 210 at the second mold 58a, the holding device 245 may further translate to the second mold 58a to remove the composite component 210. Generally prior to or following forming the composite component 210 via the plurality of machine heads 220, the holding device 245 generally translates along one or more of the first axis 201, the second axis, or the third axis 203 away from the mold 58 to enable access for the plurality of machine heads 220 to form the composite component 210.

Referring particularly to FIGS. 8F and 12, one embodiment of the method includes placing a mold 58 relative to an apparatus 200. More specifically, as shown in the illustrated embodiments, the method may include placing the mold 58 into the grid 205. Further, as shown in FIGS. 8F, 10, and 12, the method of the present disclosure further includes forming one or more fiber-reinforced outer skins 56 in the mold 58 of the composite component 210 (e.g., rotor blade panel 21). In certain embodiments, the method includes placing onto the mold 58 the outer skin(s) 56 that may include one or more continuous, multi-axial (e.g. biaxial) fiber-reinforced thermoplastic or thermoset outer skins. Further, in particular embodiments, the method of forming the fiber-reinforced outer skins 56 may include at least one of injection molding, 3-D printing, 2-D pultrusion, 3-D pultrusion, thermoforming, vacuum forming, pressure forming, bladder forming, automated fiber deposition, automated fiber tape deposition, or vacuum infusion.

Composite materials, such as may be utilized in the composite component 210, may generally include a fibrous reinforcement material embedded in matrix material, such as a polymer material (e.g., polymer matrix composite, or PMC). The reinforcement material serves as a load-bearing constituent of the composite material, while the matrix of a composite material serves to bind the fibers together and act as the medium by which an externally applied stress is transmitted and distributed to the fibers.

The method may also include forming the grid structure 62 directly to the fiber-reinforced outer skin(s) 56 via one or more of the plurality of machine heads 220 of the apparatus 200. Forming the grid structure 62 may include applying or depositing a composite tape onto the outer skin 56. PMC materials may be fabricated by impregnating a fabric or continuous unidirectional tape with a resin (prepreg), followed by curing. For example, multiple layers of prepreg may be stacked or laid-up together to the proper thickness and orientation for the part, such as the grid structure 62, and then the resin may be cured or solidified via one or more machine heads 225 to render a fiber reinforced composite component 210. The bundles of fibers may be impregnated with a slurry composition prior to forming the preform or after formation of the preform. The preform may then undergo thermal processing via one or more of the plurality of machine heads 220 or the holding device 245, such as to solidify or cure the composite component 210, or a portion thereof, such as the grid structure 62.

In addition, as shown, the outer skin(s) 56 of the rotor blade panel 21 may be curved. In such embodiments, the method may include forming the curvature of the fiber-reinforced outer skins 56. Such forming may include providing one or more generally flat fiber-reinforced outer skins, forcing the outer skins 56 into a desired shape corresponding to a desired contour via the holding device 245, and maintaining the outer skins 56 in the desired shape during printing and depositing. The method may further include heating at least a portion of the fiber-reinforced outer skin 56 to at least a first temperature threshold defining a temperature at least approximately between a glass transition temperature of the resin material and a melting temperature of the resin material. As such, the outer skins 56 generally retain their desired shape when the outer skins 56 and the grid structure 62 printed thereto are released. In addition, the apparatus 200 may be adapted to include a tooling path that follows the contour of the rotor blade panel 21.

The method may also include printing and depositing the grid structure 62 directly to the fiber-reinforced outer skin(s) 56 via the apparatus 200. More specifically, as shown in FIGS. 11, 12, 14, and 17, the apparatus 200 is configured to print and deposit a plurality of rib members 64 that intersect at a plurality of nodes 74 to form the grid structure 62 onto an inner surface of the one or more fiber-reinforced outer skins 56. As such, the grid structure 62 bonds to the fiber-reinforced outer skin(s) 56 as the structure 62 is being deposited, which eliminates the need for additional adhesive and/or curing time. For example, in one embodiment, the apparatus 200 is configured to print and deposit the rib members 64 onto the inner surface of the one or more fiber-reinforced outer skins 56 after the formed skin(s) 56 reach a desired state that enables bonding of the printed rib members 64 thereto, i.e. based on one or more parameters of temperature, time, and/or hardness. Therefore, in certain embodiments, wherein the skin(s) 56 are formed of a thermoplastic matrix, the apparatus 200 may immediately printed the rib members 64 thereto as the forming temperature of the skin(s) 56 and the desired printing temperature to enable thermoplastic welding/bonding can be the same). More specifically, in particular embodiments, before the skin(s) 56 have cooled from forming, (i.e. while the skins are still hot or warm), the apparatus 200 is configured to print and deposit the rib members 64 onto the inner surface of the one or more fiber-reinforced outer skins 56. For example, in one embodiment, the apparatus 200 is configured to print and deposit the rib members 64 onto the inner surface of the outer skins 56 before the skins 56 have completely cooled. In addition, in another embodiment, the apparatus 200 is configured to print and deposit the rib members 64 onto the inner surface of the outer skins 56 when the skins 56 have partially cooled. Thus, suitable materials for the grid structure 62 and the outer skins 56 can be chosen such that the grid structure 62 bonds to the outer skins 56 during deposition. Accordingly, the grid structure 62 described herein may be printed using the same materials or different materials.

For example, in one embodiment, a thermoset material may be infused into the fiber material on the mold 58 to form the outer skins 56 using vacuum infusion. As such, the vacuum bag is removed after curing and the one or more thermoset grid structures 62 can then be printed onto the inner surface of the outer skins 56. Alternatively, the vacuum bag may be left in place after curing. In such embodiments, the vacuum bag material can be chosen such that the material would not easily release from the cured thermoset fiber material. Such materials, for example, may include a thermoplastic material such as poly methyl methacrylate (PMMA) or polycarbonate film. Thus, the thermoplastic film that is left in place allows for bonding of thermoplastic grid structures 62 to the thermoset skins with the film in between.

In addition, the method of the present disclosure may include treating the outer skins 56 to promote bonding between the outer skins 56 and the grid structure 62. More specifically, in certain embodiments, the outer skins 56 may be treated using flame treating, plasma treating, chemical treating, chemical etching, mechanical abrading, embossing, elevating a temperature of at least areas to be printed on the outer skins 56, and/or any other suitable treatment method to promote said bonding via one or more of the machine heads 225 such as shown and described in regard to FIGS. 8A-8F and FIGS. 9A-9B. In additional embodiments, the method may include forming the outer skins 56 with more (or even less) matrix resin material on the inside surface to promote said bonding, such as via the plurality of machine heads 220, or in conjunction with the second plurality of machine heads 220a, such as shown and described in regard to FIG. 8E. In additional embodiments, the method may include varying the outer skin thickness and/or fiber content, as well as the fiber orientation.

Further, the method of the present disclosure includes varying the design of the grid structure 62 (e.g. materials, width, height, thickness, shapes, etc., or combinations thereof). As such, the grid structure 62 may define any suitable shape so as to form any suitable structure component, such as the spar cap 48, 50, the shear web 35, or additional structural components 52 of the rotor blade 16. For example, as shown in FIG. 13, the apparatus 200 may begin printing the grid structure 62 by first printing an outline of the structure 62 and building up the grid structure 62 with the rib members 64 in multiple passes. As such, machine heads 225 of the apparatus 200 can be designed to have any suitable thickness or width so as to disperse, deposit (e.g., deposit a composite fiber tape) or extrude a desired amount of resin material to create rib members 64 with varying heights and/or thicknesses. Further, the grid size can be designed to allow local buckling of the face sheet in between the rib members 64, which can influence the aerodynamic shape as an extreme (gust) load mitigation device.

More specifically, as shown in FIGS. 11-17, the rib members 64 may include, at least, a first rib member 66 extending in a first direction 76 and a second rib member 68 extending in a different, second direction 78. In several embodiments, as shown in FIG. 17, the first direction 76 of the first set 70 of rib members 64 may be generally perpendicular to the second direction 78. More specifically, in certain embodiments, the first direction 76 may be generally parallel to a chord-wise direction of the rotor blade 16 (i.e. a direction parallel to the width or chord 25 (FIG. 2)), whereas the second direction 78 of the second set 72 of rib members 64 may be generally parallel with a span-wise direction of the rotor blade 16 (i.e. a direction parallel to the length or span 23 (FIG. 2)). In still various embodiments, the first direction 76 may correspond to a direction along the first axis 201 generally shown and described in regard to FIGS. 8A-8F and FIGS. 9A-9B. Alternatively, the second direction 78 may generally correspond to a direction along the second axis 202 generally shown and described in regard to FIGS. 8A-8F and FIGS. 9A-9B. Alternatively, in one embodiment, an off-axis orientation (e.g. from about 200 to about 70° relative to the first axis 201 or the second axis 202) may be provided in the grid structure 62 to introduce bend-twist coupling to the rotor blade 16, which can be beneficial as passive load mitigation device. Alternatively, the grid structure 62 may be parallel the spar caps 48, 50.

Moreover, as shown in FIGS. 15 and 16, one or more of the first and second rib member(s) 66, 68 may be printed to have a varying height along a length 84, 85 thereof. In alternative embodiments, as shown in FIGS. 18 and 19, one or more of the first and second rib member(s) 66, 68 may be printed to have a uniform height 90 along a length 84, 85 thereof. In addition, as shown in FIGS. 11, 14, and 17, the rib members 64 may include a first set 70 of rib members 64 (that contains the first rib member 66) and a second set 72 of rib members 64 (that contains the second rib member 68).

In such embodiments, as shown in FIGS. 15 and 16, the method may include forming (e.g., via tape deposition) or printing (e.g., via extrusion) a maximum height 80 of either or both of the first set 70 of rib members 64 or the second set 72 of rib members 64 at a location substantially at (i.e. +/−10%) a maximum bending moment in the rotor blade panel 21 occurs. For example, in one embodiment, the maximum bending moment may occur at a center location 82 of the grid structure 62 though not always. As used herein, the term "center location" generally refers to a location of the rib member 64 that contains the center plus or minus a predetermined percentage of an overall length 84 of the rib member 64. For example, as shown in FIG. 15, the center location 82 includes the center of the rib member 64 plus or minus about 10%. Alternatively, as shown in FIG. 16, the center location 82 includes the center plus or minus about 80%. In further embodiments, the center location 82 may include less than plus or minus 10% from the center or greater than plus or minus 80% of the center.

In addition, as shown, the first and second sets 70, 72 of rib members 64 may also include at least one tapering end 86, 88 that tapers from the maximum height 80. More specifically, as shown, the tapering end(s) 86, 88 may taper towards the inner surface of the fiber-reinforced outer skins 56. Such tapering may correspond to certain blade locations requiring more or less structural support. For example, in one embodiment, the rib members 64 may be shorter at or near the blade tip and may increase as the grid structure 62 approaches the blade root. In certain embodiments, as shown particularly in FIG. 16, a slope of the tapering end(s) 86, 88 may be linear. In alternative embodiments, as shown in FIG. 15, the slope of the tapering end(s) 86, 88 may be non-linear. In such embodiments, the tapering end(s) 86, 88 provide an improved stiffness versus weight ratio of the panel 21.

In additional embodiments, one or more heights of intersecting rib members 64 at the nodes 74 may be different. For example, as shown in FIG. 18, the heights of the second set 72 of rib members 64 are different than the intersecting first rib member 66. In other words, the rib members 64 can have different heights for the different directions at their crossing points. For example, in one embodiment, the span-wise direction rib members 64 may have a height twice as tall as the height of the chord-wise direction rib members 64. In addition, as shown in FIG. 18, the second set 72 of rib members 64 may each have a different height from adjacent rib members 64 in the second set 72 of rib members 64. In such embodiments, as shown, the method may include printing each of the second set 70 of rib members 64 such that structures 64 having greater heights are located towards the center location 82 of the grid structure 62. In addition, the second set 70 of rib members 64 may be tapered along a length 85 thereof such that the rib members 64 are tapered shorter as the rib members approach the blade tip.

In further embodiments, as mentioned, the rib members 64 may be printed with varying thicknesses. For example, as shown in FIG. 17, the first set 70 of rib members 64 define a first thickness 94 and the second set 72 of rib members 64 define a second thickness 96. More specifically, as shown, the first and second thicknesses 94, 96 are different. In addition, as shown in FIGS. 20 and 21, the thicknesses of a single rib member 64 may vary along its length.

Referring particularly to FIG. 17, the first set 70 of rib members 64 and/or the second set 72 of rib members 64 may be evenly spaced. In alternative embodiments, as shown in FIGS. 20 and 21, the first set 70 of rib members 64 and/or the second set 72 of rib members 64 may be unevenly spaced. For example, as shown, the additive methods described herein enable complex inner structures that can be optimized for loads and/or geometric constraints of the overall shape of the rotor blade panel 21. As such, the grid structure 62 of the present disclosure may have shapes similar to those occurring in nature, such as organic structures (e.g. bird bones, leaves, trunks, or similar). Accordingly, the grid structure 62 can be printed to have an inner blade structure that optimizes stiffness and strength, while also minimizing weight.

In several embodiments, the cycle time of printing the rib members 64 can also be reduced by using a rib pattern that minimizes the amount of directional change. For example, 45-degree angled grids can likely be printed faster than 90-degree grids relative to the chord direction of the proposed printer, for example. As such, the present disclosure minimizes printer acceleration and deceleration where possible while still printing quality rib members 64.

In another embodiment, as shown in FIGS. 10 and 14, the method may include printing a plurality of grid structures 62 onto the inner surface of the fiber-reinforced outer skins 56. More specifically, as shown, the plurality of grid structures 62 may be printed in separate and distinct locations on the inner surface of the outer skins 56.

Certain advantages associated with the grid structure 62 of the present disclosure can be better understood with respect to FIG. 22. As shown, the graph 100 illustrates the stability of the rotor blade 16 (represented as the buckling load factor "BLF") on the y-axis versus the weight ratio on the x-axis. Curve 102 represents the stability versus the weight ratio for a conventional sandwich panel rotor blade. Curve 104 represents the stability versus the weight ratio for a rotor blade having a non-tapered grid structure constructed of short fibers. Curve 106 represents the stability versus the weight ratio for a rotor blade having a non-tapered grid structure without fibers. Curve 108 represents the stability versus the weight ratio for a rotor blade having a grid structure 62 constructed of tapered rib members 64 with 1:3 slope and without fibers. Curve 110 represents the stability versus the weight ratio for a rotor blade having a grid structure 62 constructed of tapered rib members 64 with 1:2 slope and without fibers. Curve 112 represents the stability versus the weight ratio for a rotor blade 16 having a grid structure 62 containing short fibers having a first thickness and being constructed of tapered rib members 64 with 1:3 slope. Curve 114 represents the stability versus the weight ratio for a rotor blade 16 having a grid structure 62 containing short fibers having a second thickness that is less than the first thickness and being constructed of tapered rib members 64 with 1:3 slope. Thus, as shown, rib members 64 containing fibers maximize the modulus thereof, while thinner rib members minimize the weight added to the rotor blade 16. In addition, as shown, higher taper ratios increase the buckling load factor.

Referring now to FIGS. 23-25, various additional features of the grid structure 62 of the present disclosure are illustrated. More specifically, FIG. 23 illustrates a partial, top view of one embodiment of the printed grid structure 62, particularly illustrating one of the nodes 74 thereof. As shown, the apparatus 200 may form at least one substantially 45-degree angle 95 for a short distance at one or more of the plurality of nodes 74. As such, the 45-degree angle 95 is configured to increase the amount of abutment or bonding at the corners. In such embodiments, as shown, there may be a slight overlap in this corner node.

Referring particularly to FIG. 24, a partial, top view of one embodiment of the printed grid structure 62 is illustrated, particularly illustrating a start printing location and an end printing location of the grid structure 62. This helps with the startup and stop of printing the ribs. When the apparatus 200 begins to print the rib members 64 and the process accelerates, the extruders may not perfectly extrude the resin material. Thus, as shown, the apparatus 200 may start the printing process with a curve or swirl to provide a lead in for the rib member 64. By extruding this swirl at the start location, the machine heads 225 are given time to more slowly ramp up/down their pressure, instead of being required to instantaneously start on top of a narrow free-standing starting point. As such, the swirl allows for the grid structures 65 of the present disclosure to be printed at higher speeds.

In certain instances, however, this start curve may create a small void 99 (i.e. the area within the swirl) in the start region which can create issues as the void 99 propagates up through ongoing layers. Accordingly, the apparatus 200 is also configured to end one of the rib members 64 within the swirl of the start region so as to prevent the void 99 from developing. More specifically, as shown, the apparatus 200 essentially fills the start curve of the one of the rib members 64 with an end location of another rib member 64.

Referring particularly to FIG. 25, an elevation view of one embodiment of one of the rib members 64 of the printed grid structure 62 is illustrated, particularly illustrating a base section 55 of the rib members 64 having a wider W and thinner T first layer so as to improve bonding of the grid structure 62 to the outer skins 56 of the rotor blade panel 21. To form this base section 55, the apparatus 200 prints a first layer of the grid structure 62 such that the individual base sections 55 define a cross-section that is wider and thinner than the rest of the cross-section of the rib members 64. In other words, the wider and thinner base section 55 of the rib members 64 provides a larger surface area for bonding to the outer skins 56, maximum heat transfer to the outer skins 56, and allows the apparatus 200 to operate at faster speeds on the first layer. In addition, the base section 55 may minimize stress concentrations at the bond joint between the structure 62 and the outer skins 56.

Referring now to FIGS. 26-31, the apparatus 200 described herein is also configured to print at least one additional feature 63 directly to the grid structure(s) 62, wherein heat from the printing bonds the additional features 63 to the structure 62. As such, the additional feature(s) 63 can be directly 3-D printed into the grid structure 62. Such printing allows for the additional feature(s) 63 to be printed into the grid structure 62 using undercuts and/or negative draft angles as needed. In addition, in certain instances, hardware for various blade systems can be assembled within the grid structure 62 and then printed over to encapsulate/protect such components.

For example, as shown in FIGS. 26-29, the additional feature(s) 63 may include auxiliary features 81 and/or assembly features 69. More specifically, as shown in FIGS. 26 and 27, the assembly feature(s) 69 may include one or more alignment structures 73, at least one handling or lift feature 71, one or more adhesive gaps or standoffs 95, or one or more adhesive containment areas 83. For example, in one embodiment, the apparatus 200 is configured to print a plurality of handling features 71 to the grid structure 62 to provide multiple gripping locations for removing the rotor blade panel 21 from the mold 58. Further, as shown in FIG. 24, one or more adhesive containment areas 83 may be formed into the grid structure 62, e.g. such that another blade component can be secured thereto or thereby.

In particular embodiments, as shown in FIGS. 27 and 28, the alignment or lead in structure(s) 73 may include any spar cap and/or shear web alignment features. In such embodiments, as shown, the grid structure(s) 62 may printed such that an angle of the plurality of rib members 64 is offset from a spar cap location so as to create an adhesive containment area 83. More specifically, as shown, the adhesive containment areas 83 are configured to prevent squeeze out of an adhesive 101. It should be further understood that such adhesive containment areas 83 are not limited to spar cap locations, but may be provided in any suitable location on the grid structure 62, including but not limited to locations adjacent to the leading edge 24, the trailing edge 26, or any other bond locations.

In further embodiments, the alignment structure(s) 73 may correspond to support alignment features (e.g. for support structure 52), blade joint alignment features, panel alignment features 75, or any other suitable alignment feature. More specifically, as shown in FIG. 27, the panel alignment features 75 may include a male alignment feature 77 or a female alignment feature 79 that fits with a male alignment feature 77 or a female alignment feature 79 of an adjacent rotor blade panel 21.

Further, as shown in FIG. 30, the additional feature(s) 63 may include at least one auxiliary feature 81 of the rotor blade panel 21. For example, in one embodiment, the auxiliary features 81 may include a balance box 67 of the rotor blade 16. In such embodiments, the step of printing the additional feature(s) 63 into the grid structure(s) 62 may include enclosing at least a portion of the grid structure 62 to form the balance box 63 therein. In additional embodiments, the auxiliary feature(s) 81 may include housings 87, pockets, supports, or enclosures e.g. for an active aerodynamic device, a friction damping system, or a load control system, ducting 89, channels, or passageways e.g. for deicing systems, one or more valves, a support 91, tubing, or channel around a hole location of the fiber-reinforced outer skins, a sensor system having one or more sensors 103, one or more heating elements 105 or wires 105, rods, conductors, or any other printed feature. In one embodiment, for example, the supports for the friction damping system may include sliding interface elements and/or free interlocking structures. For example, in one embodiment, the 3-D printed grid structure 62 offers the opportunity to easily print channels therein for providing warmed air from heat source(s) in the blade root or hub to have a de-icing effect or prevent ice formation. Such channels allow for air contact directly with the outer skins 56 to improve heat transfer performance.

In particular embodiments, the sensor system may be incorporated into the grid structure(s) 62 and/or the outer skins 56 during the manufacturing process. For example, in one embodiment, the sensor system may be a surface pressure measurement system arranged with the grid structure 62 and/or directly incorporated into the skins 56. As such, the printed structure and/the skins 56 are manufactured to include the series of tubing/channels needed to easily install the sensor system. Further, the printed structure and/or the skins 56 may also provide a series of holes therein for receiving connections of the system. Thus, the manufacturing process is simplified by printing various structures into the grid structure 62 and/or the skins 56 to house the sensors, act as the static pressure port, and/or act as the tubing that runs directly to the outer blade skin. Such systems may also enable the use of pressure taps for closed loop control of the wind turbine 10.

In still further embodiments, the mold 58 may include certain marks (such as a positive mark) that are configured to create a small dimple in the skin during manufacturing.

Such marks allow for easy machining of the holes in the exact location needed for the associated sensors. In addition, additional sensor systems may be incorporated into the grid structures and/or the outer or inner skin layers 56 to provide aerodynamic or acoustic measurements so as to allow for either closed loop control or prototype measurements.

In addition, the heating elements 105 described herein may be flush surface mounted heating elements distributed around the blade leading edge. Such heating elements 105 allow for the determination of the angle of attack on the blade by correlating temperature/convective heat transfer with flow velocity and the stagnation point. Such information is useful for turbine control and can simplify the measurement process. It should be understood that such heating elements 105 may also be incorporated into the outer or inner skin layers 56 in additional ways and are not required to be flush mounted therein.

Referring back to FIG. 26, the method according to the present disclosure may include placing a filler material 98 between one or more of the rib members 64. For example, in certain embodiments, the filler material 98 described herein may be constructed of any suitable materials, including but not limited to low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), polyethylene terephthalate (PET) foams, other foam rubbers/resin-based foams and various other open cell and closed cell foams.

Referring back to FIG. 29, the method may also include printing one or more features 93 onto the outer skins 56, e.g. at the trailing and/or leading edges of the rotor blade panels 21. For example, as shown in FIG. 29, the method may include printing at least one lightning protection feature 96 onto at least one of the one or more fiber-reinforced outer skins 56. In such embodiments, the lightning protection feature 93 may include a cooling fin or a trailing edge feature having less fiber content than the fiber-reinforced outer skins 56. More specifically, the cooling fins may be directly printed to the inside surface of the outer skins 56 and optionally loaded with fillers to improve thermal conductivity but below a certain threshold to address lightning related concerns. As such, the cooling fins are configured to improve thermal transfer from the heated airflow to the outer skins 56. In additional embodiments, such features 93 may be configured to overlap, e.g. such as interlocking edges or snap fits.

Referring now to FIGS. 31 and 32, the additional feature (s) 63 may include an adhesive gap 95 or stand-off, which may be incorporated into the grid structures 62. Such standoffs 95 provide a specified gap between two components when bonded together so to minimize adhesive squeeze out. As such, the standoffs 95 provide the desired bond gap for optimized bond strength based on the adhesive used.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus for manufacturing a composite component, the apparatus comprising:
    a mold comprising a composite substrate on a top surface of the mold, wherein the mold is disposed within a grid defined by a first axis and a second axis, the composite substrate constructed of a thermoset resin material or a thermoplastic resin material reinforced with one or more fiber materials with a thermoplastic film arranged thereon, the thermoplastic film defining a more resin-rich surface as compared to the composite substrate;
    a first frame assembly disposed above the mold; and,
    a first group of printheads coupled to the first frame assembly within the grid in an adjacent arrangement along the first axis, each of the first group of printheads comprising an extruder,
    wherein the first group of printheads is moveable together along at least one of the first axis and the second axis,
    a mechanism configured to articulate the first group of printheads about the mold atop the thermoplastic film of the composite substrate; and
    a control unit configured to control the mechanism, the control unit comprising at least one processor, the processor configured to implement a plurality of operations, the plurality of operations comprising:
        instructing the first group of printheads to deposit a first volume of fluid composite in a predesigned pattern at a first zone on the thermoplastic film of the composite substrate atop the mold via the extruders;
        instructing the mechanism to move the first group of printheads to a second zone on the thermoplastic film of the composite substrate atop the mold; and
        instructing the first group of printheads to deposit a second volume of the fluid composite in the predesigned pattern at the second zone on the thermoplastic film of the composite substrate atop the mold, the first and second zones being adjacent to each other such that the deposited first and second volumes of fluid composite at the first and second zones form a grid structure.

2. The apparatus of claim 1, wherein the plurality of operations further comprise pausing depositing of the fluid composite after instructing the first group of printheads to deposit the first volume of the fluid composite in the predesigned pattern at the first zone on the at least one resin-rich area of the thermoplastic film of the composite substrate atop the mold via the extruders.

3. The apparatus of claim 1, wherein the composite structure is secured atop the mold via a vacuum.

4. The apparatus of claim 1, wherein the one or more fiber materials comprises one or more continuous, multi-axial fibers.

5. The apparatus of claim 1, wherein the thermoplastic film is comprised of polymethyl methacrylate (PMMA), glycolised polyethylene terephthalate (PET-G), acrylonitrile butadiene styrene (ABS), or polycarbonate.

6. The apparatus of claim 1, wherein the composite substrate is formed via at least one of injection molding, 3-D printing, 2-D pultrusion, 3-D pultrusion, thermoforming, vacuum forming, pressure forming, bladder forming, automated fiber deposition, automated fiber tape deposition, or vacuum infusion.

7. The apparatus of claim 1, wherein the first axis is substantially parallel to one of a length or a width of the composite component.

8. The apparatus of claim 7, wherein the first group of machine heads are in an adjacent arrangement along the first axis, such as to extend generally along the length or the width of the composite component.

9. The apparatus of claim 1, wherein the second axis is further defined substantially parallel to one of a length or a width of the composite component.

10. The apparatus of claim 1, wherein the mold and composite substrate are curved.

11. The apparatus of claim 1, further comprising a holding device, wherein a curvature of the composite substrate is formed by forcing one or more outer skins into a desired shape corresponding to a desired contour of the composite substrate via the holding device and maintaining the one or more outer skins in the desired shape while the first and second volumes of fluid composite are deposited.

12. The apparatus of claim 11, further comprising a heating device for heating at least a portion of the composite substrate to at least a first temperature threshold defining a temperature at least approximately between a glass transition temperature of the thermoset resin material or the thermoplastic resin material in the composite substrate and a melting temperature of the thermoset resin material or the thermoplastic resin material of the composite substrate.

13. The apparatus of claim 12, wherein the apparatus comprises a tooling path that follows the curvature of the composite component.

14. The apparatus of claim 1, wherein the thermoplastic film forms at least a portion of a vacuum bag used in a vacuum infusion process.

15. An apparatus for manufacturing a composite component, the apparatus comprising:
- a mold comprising a composite substrate on a top surface of the mold, wherein the mold is disposed within a grid defined by a first axis and a second axis, the composite substrate constructed of a thermoplastic resin material reinforced with one or more continuous, multi-axial fibers and comprising at least one resin-rich area formed into a surface of the composite substrate, the at least one resin-rich area containing more thermoplastic resin than remaining portions of the composite substrate;
- a first frame assembly disposed above the mold; and,
- a first group of printheads coupled to the first frame assembly within the grid in an adjacent arrangement along the first axis, each of the first group of printheads comprising an extruder,
- wherein the first group of printheads is moveable together along at least one of the first axis and the second axis,
- a mechanism configured to articulate the first group of printheads about the mold atop the composite substrate; and
- a control unit configured to control the mechanism, the control unit comprising at least one processor, the processor configured to implement a plurality of operations, the plurality of operations comprising:
  - instructing the first group of printheads to deposit a first volume of fluid composite in a predesigned pattern at a first zone on the at least one resin-rich area of the composite substrate atop the mold via the extruders;
  - instructing the mechanism to move the first group of printheads to a second zone on the at least one resin-rich area of the composite substrate atop the mold; and
  - instructing the first group of printheads to deposit a second volume of the fluid composite in the predesigned pattern at the second zone on the at least one resin-rich area of the composite substrate atop the mold, the first and second zones being adjacent to each other such that the deposited first and second volumes of fluid composite at the first and second zones form a grid structure.

16. The apparatus of claim 15, wherein the plurality of operations further comprise pausing depositing of the fluid composite after instructing the first group of printheads to deposit the first volume of the fluid composite in the predesigned pattern at the first zone on the at least one resin-rich area of the composite substrate atop the mold via the extruders.

17. The apparatus of claim 15, wherein the composite structure is secured atop the mold via a vacuum.

18. The apparatus of claim 15, wherein the composite substrate is formed via at least one of injection molding, 3-D printing, 2-D pultrusion, 3-D pultrusion, thermoforming, vacuum forming, pressure forming, bladder forming, automated fiber deposition, automated fiber tape deposition, or vacuum infusion.

19. The apparatus of claim 15, wherein the first axis is substantially parallel to one of a length or a width of the composite component, and wherein the first group of machine heads are in an adjacent arrangement along the first axis, such as to extend generally along the length or the width of the composite component.

20. The apparatus of claim 15, wherein the mold and composite substrate are curved, the apparatus further comprising a holding device, wherein a curvature of the composite substrate is formed by forcing one or more outer skins into a desired shape corresponding to a desired contour of the composite substrate via the holding device and maintaining the one or more outer skins in the desired shape while the first and second volumes of fluid composite are deposited.

* * * * *